United States Patent
Aga et al.

(10) Patent No.: US 10,906,747 B2
(45) Date of Patent: Feb. 2, 2021

(54) CONVEYANCE SYSTEM, CONTROL APPARATUS, AND CONVEYANCE METHOD

(71) Applicant: Komatsu Ltd., Tokyo (JP)

(72) Inventors: Yasuaki Aga, Tokyo (JP); Kazuhiko Iwata, Tokyo (JP); Yuichi Kodama, Tokyo (JP); Masaaki Uetake, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 16/484,203

(22) PCT Filed: May 31, 2018

(86) PCT No.: PCT/JP2018/021050
§ 371 (c)(1),
(2) Date: Aug. 7, 2019

(87) PCT Pub. No.: WO2019/017083
PCT Pub. Date: Jan. 24, 2019

(65) Prior Publication Data
US 2019/0367292 A1 Dec. 5, 2019

(30) Foreign Application Priority Data
Jul. 21, 2017 (JP) .................................. 2017-142194

(51) Int. Cl.
*B65G 43/08* (2006.01)
*B65G 47/68* (2006.01)
(Continued)

(52) U.S. Cl.
CPC ............. *B65G 43/08* (2013.01); *B65G 47/68* (2013.01); *B65G 67/08* (2013.01); *G01G 11/003* (2013.01);
(Continued)

(58) Field of Classification Search
None
See application file for complete search history.

(56) References Cited

U.S. PATENT DOCUMENTS 2,164,796 A * 7/1939 Bird ....................... B65G 67/08
209/44
2,662,665 A * 12/1953 Harper ................ G01G 11/083
222/55
(Continued)

FOREIGN PATENT DOCUMENTS

JP  S53-008693 U  1/1978
JP  S58-32434 U   3/1983
(Continued)

OTHER PUBLICATIONS

International Search Report dated Aug. 7, 2018, issued for PCT/JP2018/021050.

*Primary Examiner* — William R Harp
(74) *Attorney, Agent, or Firm* — Locke Lord LLP

(57) ABSTRACT

A conveyance system includes a conveyance device including a first conveyance mechanism configured to convey freight supplied from a loader, and a second conveyance mechanism configured to convey the freight supplied from the first conveyance mechanism, a weight detection device configured to detect weight of the freight loaded on the second conveyance mechanism, and a control apparatus. The control apparatus includes a first conveyance control unit configured to control the first conveyance mechanism. The first conveyance control unit controls the first conveyance mechanism based on a detection value of the weight detection device.

17 Claims, 13 Drawing Sheets

(51) Int. Cl.
  *B65G 67/08* (2006.01)
  *G01G 11/00* (2006.01)
  *G01G 11/08* (2006.01)
  *G01G 11/12* (2006.01)
  *E02F 7/00* (2006.01)

(52) U.S. Cl.
  CPC ........... *G01G 11/083* (2013.01); *G01G 11/12* (2013.01); *E02F 7/00* (2013.01)

(56) References Cited

U.S. PATENT DOCUMENTS

| | | | |
|---|---|---|---|
| 4,614,264 A | | 9/1986 | Fishbume |
| 4,729,442 A | * | 3/1988 | Sichet .................... G01G 11/12 177/123 |
| 6,662,930 B2 | * | 12/2003 | Yester .................... G01G 11/00 177/119 |
| 8,967,363 B2 | | 3/2015 | Lowery |
| 9,873,365 B2 | * | 1/2018 | Uetake ...................... B60P 1/32 |

FOREIGN PATENT DOCUMENTS

| | | |
|---|---|---|
| JP | S62-100616 A | 5/1987 |
| JP | H05-246528 A | 9/1993 |
| JP | H06-58519 A | 3/1994 |
| JP | H11-79380 A | 3/1999 |
| JP | 2003-83797 A | 3/2003 |

\* cited by examiner (A)

(B)

(A)

(B)

CONVEYANCE SYSTEM, CONTROL APPARATUS, AND CONVEYANCE METHOD

FIELD

The present invention relates to a conveyance system, a control apparatus, and a conveyance method.

BACKGROUND

As a method of conveying freight such as ores or sediment in mines, there are known a method of using a loader and a transporter vehicle, and a method of using a conveyor in place of a transporter vehicle. The method of using a loader and a transporter vehicle is a method of loading freight onto the transporter vehicle using the loader and conveying the freight to a destination by the transporter vehicle. The method of using a conveyor is a method of inputting excavated ores or sediment into a crusher, and conveying freight crushed by the crusher, to a destination by the conveyor. Patent Literature 1 discloses an example of a method of conveying freight using a loader and a transporter vehicle.

CITATION LIST

Patent Literature

Patent Literature 1: U.S. Pat. No. 8,967,363

SUMMARY

Technical Problem

In the method of using a loader and a transporter vehicle, productivity in mines may deteriorate unless a work of the loader and a work of the transporter vehicle are appropriately coordinated. For example, if the next transporter vehicle does not immediately come to a loading position after a loading work is ended by a loader, a wait time is generated in the loader. If the wait time of the loader elongates and work efficiency of the loader declines, productivity in mines declines. In addition, if the next transporter vehicle needs to wait at a standby position until a loading work is ended by the loader, a wait time is generated in the transporter vehicle. Also when the wait time of the transporter vehicle elongates and work efficiency of the transporter vehicle declines, productivity in mines declines.

In this manner, ambivalence exists in such a manner that enhancement in work efficiency of the loader deteriorates work efficiency of the transporter vehicle and enhancement in work efficiency of the transporter vehicle deteriorates work efficiency of the loader. In addition, even if a work of the loader and a work of the transporter vehicle are appropriately coordinated, a work of one of the loader and the transporter vehicle may affect the other one, and a wait time may be accordingly generated in the other one. For example, if the transporter vehicle fails to appropriately stop at a loading position, the transporter vehicle executes a calibration work of the stop position. By the transporter vehicle executing the calibration work of the stop position, a wait time is generated in the loader. In addition, if the loader has troubles in an excavation work preceding to loading even though the transporter vehicle arrives at a loading position, a wait time is generated in the transporter vehicle.

In addition, in the method of using the loader and the transporter vehicle, conveyance efficiency of the transporter vehicle may decline unless a loading amount of freight to be loaded onto the transporter vehicle is appropriately managed. For example, if a loading amount of freight to be actually loaded onto the transporter vehicle is deficient with respect to the maximum loading amount of the transporter vehicle, because an amount of freight that can be conveyed in one transportation work becomes small, conveyance efficiency of the transporter vehicle declines. In addition, if a loading amount of freight to be actually loaded onto the transporter vehicle is excessive with respect to the maximum loading amount of the transporter vehicle, a travel speed of the transporter vehicle may be decreased. Also in this case, conveyance efficiency of the transporter vehicle declines. If conveyance efficiency of the transporter vehicle declines, productivity in mines declines.

On the other hand, the method of using a conveyor in place of a transporter vehicle can continuously convey freight, and has higher conveyance efficiency as compared with the method of using the loader and the transporter vehicle. Nevertheless, the method of using a conveyor has such disadvantages that initial cost is high and flexibility is low in conveyance route change.

The object of an aspect of the present invention is to provide a technique that can suppress a decline in durability of a transporter vehicle that is caused by overloading, and a decline in conveyance efficiency, and enhance productivity in mines, in the case of conveying freight using a loader and a transporter vehicle.

Solution to Problem

According to an aspect of the present invention, a conveyance system comprises: a conveyance device including a first conveyance mechanism configured to convey freight supplied from a loader, and a second conveyance mechanism configured to convey the freight supplied from the first conveyance mechanism; a weight detection device configured to detect weight of the freight loaded on the second conveyance mechanism; and a control apparatus, wherein the control apparatus includes a first conveyance control unit configured to control the first conveyance mechanism, and wherein the first conveyance control unit controls the first conveyance mechanism based on a detection value of the weight detection device.

Advantageous Effects of Invention

According to an aspect of the present invention, there is provided a technique that can suppress a decline in durability of a transporter vehicle that is caused by overloading, and a decline in conveyance efficiency, and enhance productivity in mines, in the case of conveying freight using a loader and a transporter vehicle.

DESCRIPTION OF EMBODIMENTS

Embodiments according to the present invention will be described below with reference to the drawings. Nevertheless, the present invention is not limited to these. Components in the embodiments to be described below can be appropriately combined. In addition, a part of components is not used in some cases.

In the following description, an XYZ-orthogonal coordinate system is set, and a positional relationship between units will be described with reference to the XYZ-orthogonal coordinate system. A direction parallel to an X-axis in a horizontal plane, that is to say, an XY-plane will be referred to as an X-axis direction, a direction parallel to a Y-axis orthogonal to the X-axis in the horizontal plane will be referred to as a Y-axis direction, and a direction parallel to a Z-axis orthogonal to the X-axis and the Y-axis will be referred to as a Z-axis direction. The Z-axis direction is a vertical direction. In the vertical direction, a direction in which gravitational force acts is a downward direction, and a direction opposite to the direction in which gravitational force acts is an upward direction.

First Embodiment

Conveyance System

Figure 1:
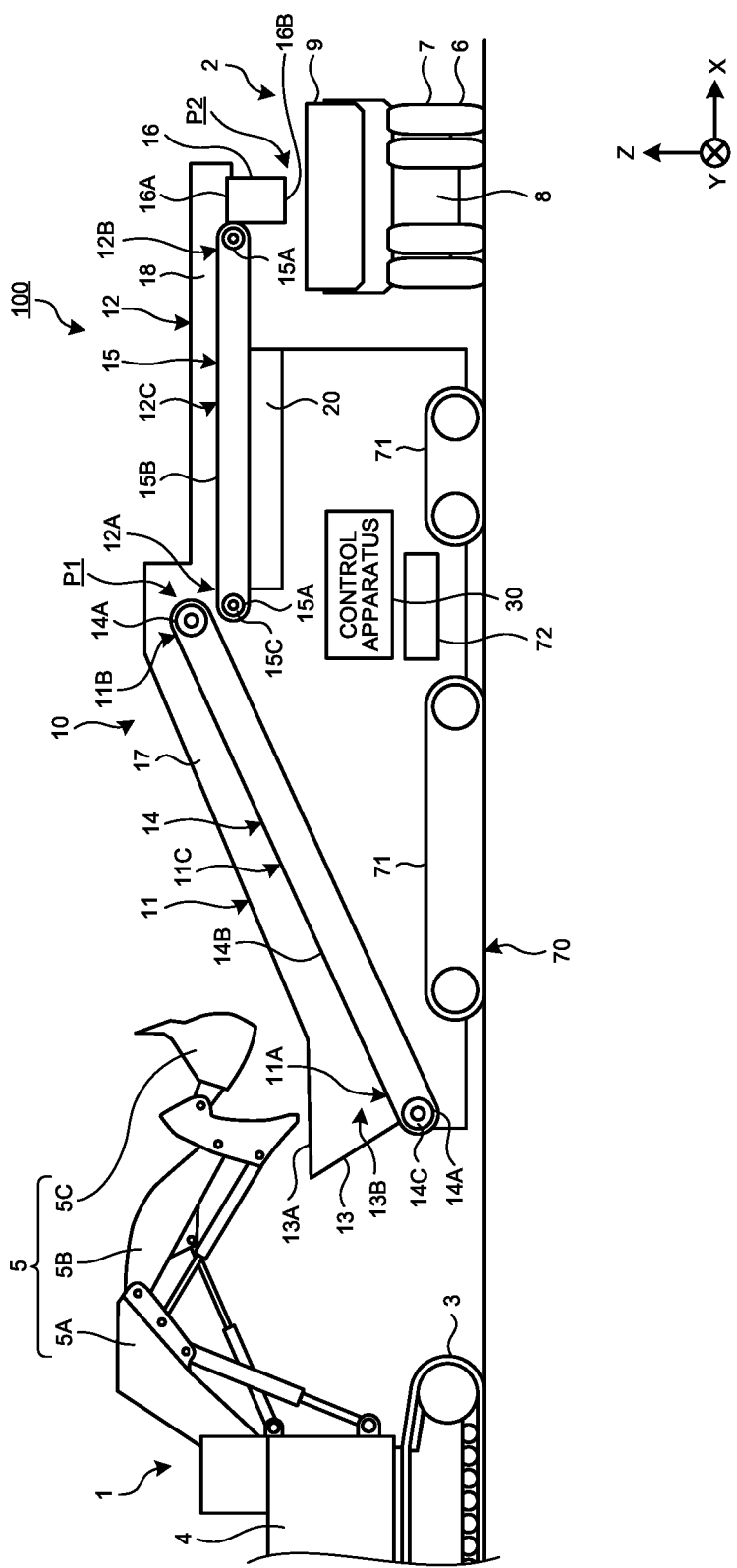
FIG. 1 is a side view schematically illustrating an example of a conveyance system according to a first embodiment.
Figure 2:
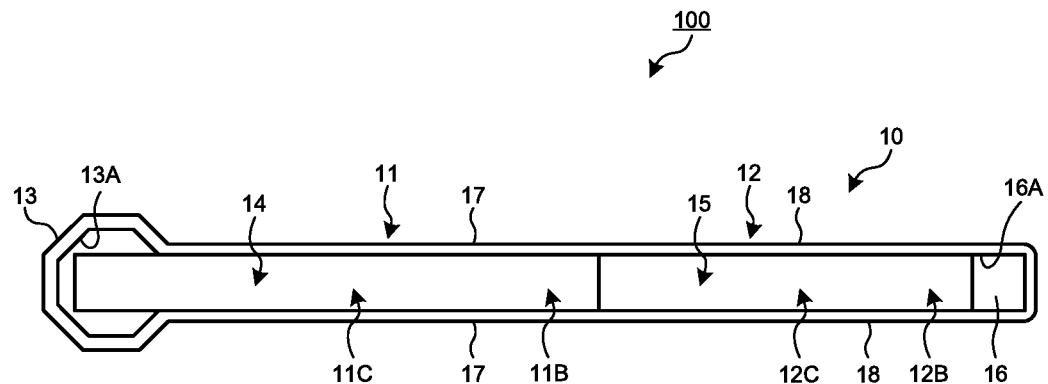
FIG. 2 is a plan view schematically illustrating an example of the conveyance system according to the first embodiment.

A first embodiment will be described. FIG. 1 is a side view schematically illustrating an example of a conveyance system 100 according to the present embodiment. FIG. 2 is a plan view schematically illustrating an example of the conveyance system 100 according to the present embodiment. The conveyance system 100 is provided in a loading site of a mine. The mine refers to a location or a business place in which minerals are excavated. The loading site refers to an area in which a loading work of freight W is executed in the mine. As the freight W, an ore or sediment excavated in the mine is exemplified.

The conveyance system 100 conveys the freight W supplied from a loader 1. The loader 1 is a member separated from the conveyance system 100. The conveyance system 100 includes a conveyance device 10, a weight detection device 20, a control apparatus 30, and a travel apparatus 70. The conveyance device 10 includes a first conveyance mechanism 11 that conveys the freight W supplied from the loader 1, and a second conveyance mechanism 12 that conveys the freight W supplied from the first conveyance mechanism 11, to a transporter vehicle 2. The weight detection device 20 detects weight of the freight W loaded on the second conveyance mechanism 12. The control apparatus 30 controls at least the first conveyance mechanism 11 based on a detection value of the weight detection device 20. In the present embodiment, the control apparatus 30 controls the first conveyance mechanism 11 and the second conveyance mechanism 12. The travel apparatus 70 movably supports the conveyance device 10.

The loader 1 is an excavator, for example, and includes a travel body 3, a swing body 4, and working equipment 5. The travel body 3 travels by rotating a crawler track. The swing body 4 is swingably supported on the travel body 3. The working equipment 5 includes a boom 5A coupled to the swing body 4, an arm 5B coupled to the boom 5A, and a bucket 5C coupled to the arm 5B. The loader 1 supplies the freight W scooped by the bucket 5C, to the first conveyance mechanism 11. In addition, the loader 1 is not limited to an excavator, and may be a rope shovel, a wheel loader, or the like.

The transporter vehicle 2 is a dump truck, and includes a travel apparatus 7 including wheels to which tires 6 are attached, a vehicle body 8 supported by the travel apparatus 7, and a vessel 9 supported on the vehicle body 8. The conveyance system 100 loads the freight W onto the vessel 9 of the transporter vehicle 2. In addition, the type of the dump truck is not limited, and may be a rigid dump truck or an articulated dump truck, for example.

The first conveyance mechanism 11 conveys the freight W supplied from the loader 1. The first conveyance mechanism 11 includes a receiving unit 11A to which the freight W is to be supplied from the loader 1, a feeding unit 11B that feeds the freight W to the second conveyance mechanism 12, and a conveyance unit 11C that conveys the freight W from the receiving unit 11A to the feeding unit 11B.

The first conveyance mechanism 11 includes a hopper 13 to which the freight W is to be supplied from the loader 1, and a conveyor 14 that can continuously convey the freight W supplied to the hopper 13.

The hopper 13 includes an input port 13A provided in an upper part, and a reservoir portion 13B provided below the input port 13A. The loader 1 inputs the freight W to the input port 13A of the hopper 13. The hopper 13 temporarily reserves the freight W input to the input port 13A from the loader 1. At least part of the conveyor 14 is installed in a bottom portion of the hopper 13. The receiving unit 11A includes the conveyor 14 installed in the bottom portion of the hopper 13. The freight W reserved in the hopper 13 includes the freight W placed on the conveyor 14 installed in the bottom portion of the hopper 13. In a state in which the freight W is reserved in the hopper 13, by the conveyor 14 operating at a constant speed, the freight W is conveyed from the reservoir portion 13B to the feeding unit 11B by a constant amount per unit time ideally. In other words, the conveyor 14 continuously conveys the freight W supplied from the hopper 13.

The hopper 13 has capacity corresponding to some quantity of the freight W. For example, the freight W can be reserved in an amount corresponding to a plurality of inputs performed by the loader 1. With such a structure, the conveyance system 100 can receive the freight W input by the loader 1, even in a state in which a conveyance operation of the first conveyance mechanism 11 is stopped. Thus, even if a conveyance operation of the first conveyance mechanism 11 is stopped, a wait time of the loader 1 can be suppressed or eliminated. It is sufficient that the capacity of the hopper 13 is equal to or larger than the amount of the freight W that corresponds to a plurality of inputs performed by the loader 1.

Based on an amount to be input by the loader 1 to the hopper 13 in one loading, a time required by the loader 1 for one loading, the maximum loading amount of the transporter vehicle 2, a time interval at which the transporter vehicle 2 arrives at a loading position P2, and the like, the capacity of the hopper 13 is defined in such a manner that a wait time of the loader 1 is shortened or eliminated.

In addition, a time interval at which the transporter vehicle 2 arrives at the loading position P2 may be a time from when a first transporter vehicle 2 out of a plurality of transporter vehicles 2 operating in the mine leaves the loading position P2 to when a second transporter vehicle 2 different from the first transporter vehicle 2 arrives at the loading position P2, or may be a time from when one transporter vehicle 2 leaves the loading position P2 to when the one transporter vehicle 2 arrives at the loading position P2 again.

The loading position P2 refers to a position at which a loading work onto the transporter vehicle 2 is executed by the second conveyance mechanism 12 of the conveyance system 100. In the present embodiment, the loading position P2 is a position to which the freight W fed from a feeding unit 12B of the second conveyance mechanism 12, which will be described later, is to be supplied. More specifically, the loading position P2 is a position immediately below the feeding unit 12B, and is a position to which the freight W fed from the feeding unit 12B drops.

For preventing the loader 1 from excessively loading freight onto the hopper 13 to such an extent that the hopper 13 cannot reserve the freight, the conveyance system 100 may be provided with a report system for reporting, to a driver of the loader 1, information such as a reservoir remaining amount of the hopper 13 or loadability. As a report system, for example, at least one of a light emitting device such as a lamp, a warning tone generation device, and a communication device that communicates report data to the loader 1 is exemplified.

The conveyor 14 is an apron conveyor (apron feeder). The conveyor 14 includes a plurality of sprockets 14A, an apron 14B supported by a chain put on the sprockets 14A, and an actuator 14B that drives the sprockets 14A. The sprockets 14A are rotated by drive force generated by the actuator 14C. By the sprockets 14A rotating, the apron 14B operates. In addition, the conveyor 14 is not limited to an apron conveyor, and may be a belt conveyor, for example, or may be another similar conveyance device.

The conveyance unit 11C includes a conveyance surface of the apron 14B of the conveyor 14. The conveyance unit 11C can continuously convey the freight W. The receiving unit 11A includes one end portion of the conveyance surface in a conveyance direction of the apron 14B that is installed in the bottom portion of the hopper 13. The conveyance direction of the apron 14B is a direction heading for the feeding unit 11B from the receiving unit 11A. The feeding unit 11B includes another end portion of the conveyance surface in the conveyance direction of the apron 14B. In the present embodiment, the feeding unit 11B is disposed superior to the receiving unit 11A. The conveyance unit 11C is inclined upward toward the feeding unit 11B.

The freight W supplied from the loader 1 to the first conveyance mechanism 11 is supplied to the conveyance unit 11C via the hopper 13 and loaded thereon. By the operation of the apron 14B, the freight W loaded on the conveyance unit 11C is conveyed to the feeding unit 11B. Based on the rotating speed of the sprockets 14A, the conveyance speed of the freight W conveyed by the first conveyance mechanism 11 is defined. The rotating speed of the sprockets 14A corresponds to the conveyance speed of the first conveyance mechanism 11.

The second conveyance mechanism 12 receives the freight W from the first conveyance mechanism 11 at a receiving position P1, and conveys the freight W to the loading position P2. The receiving position P1 includes a boundary position between the first conveyance mechanism 11 and the second conveyance mechanism 12. The second conveyance mechanism 12 includes a receiving unit 12A to which the freight W is to be supplied from the first conveyance mechanism 11, the feeding unit 12B that feeds the freight W to the loading position P2, and a conveyance unit 12C that conveys the freight W from the receiving unit 12A to the feeding unit 12B.

The second conveyance mechanism 12 includes a conveyor 15 that can continuously convey the freight W supplied from the first conveyance mechanism 11.

The conveyor 15 is an apron conveyor (apron feeder). The conveyor 15 includes a plurality of sprockets 15A, an apron 15B supported by a chain put on the sprockets 15A, and an actuator 15C that drives the sprockets 15A. The sprockets 15A are rotated by drive force generated by the actuator 15C. By the sprockets 15A rotating, the apron 15B operates. In addition, the conveyor 15 is not limited to an apron conveyor, and may be a belt conveyor, for example, or may be another similar conveyance device.

The conveyance unit 12C includes a conveyance surface of the apron 15B of the conveyor 15. The conveyance unit 12C can continuously convey the freight W. The receiving unit 12A includes one end portion of the conveyance surface in the conveyance direction of the apron 15B. The conveyance direction of the apron 15B is a direction heading for the feeding unit 12B from the receiving unit 12A. The feeding unit 12B includes another end portion of the conveyance surface in the conveyance direction of the apron 15B. In the present embodiment, the position of the receiving unit 12A in the vertical direction is substantially equal to the position of the feeding unit 12B. In other words, the conveyance unit 12C is substantially parallel to the horizontal plane.

The receiving unit 12A of the second conveyance mechanism 12 is disposed inferior to the feeding unit 11B of the first conveyance mechanism 11. When viewed from the Y-axis direction or the Z-axis direction, the feeding unit 11B of the first conveyance mechanism 11 and the receiving unit 12A of the second conveyance mechanism 12 overlap. The freight W fed by the feeding unit 11B of the first conveyance mechanism 11 drops to the receiving unit 12A of the second conveyance mechanism 12 by the action of gravitational force. The receiving unit 12A is disposed at a position at which the freight W dropped from the feeding unit 11B can be received.

The freight W supplied from the first conveyance mechanism 11 to the second conveyance mechanism 12 is loaded on the conveyance unit 12C. By the operation of the apron 15B, the freight W loaded on the conveyance unit 12C is conveyed to the feeding unit 12B. Based on the rotating speed of the sprockets 15A, the conveyance speed of the freight W conveyed by the second conveyance mechanism 12 is defined. The rotating speed of the sprockets 15A corresponds to the conveyance speed of the second conveyance mechanism 12.

In addition, in the present embodiment, the conveyance unit 11C includes the conveyor 14 but the conveyance unit 11C may include a feeder. Similarly, the conveyance unit 12C may include a feeder.

In the present embodiment, the conveyance system 100 includes a shooter 16 that adjusts the position of the freight W to be supplied to the transporter vehicle 2. The freight W fed from the second conveyance mechanism 12 is supplied to the transporter vehicle 2 via the shooter 16.

The shooter 16 is a member including an input port 16A provided in an upper part, and a discharge port 16B provided in a bottom portion. The freight W fed from the second conveyance mechanism 12 is input to the input port 16A of the shooter 16. In the present embodiment, the shooter 16 can change the position of the discharge port 16B in the Y-axis direction. In the present embodiment, the shooter 16 can tilt in a rotational direction around a rotational axis parallel to the X-axis. By the shooter 16 tilting, the position of the discharge port 16B in the X-axis direction and the Y-axis direction changes. By the position of the discharge port 16B being adjusted, the position of the freight W to be supplied to the vessel 9 of the transporter vehicle 2 is adjusted. The shooter 16 adjusts the shape (loading style) of the freight W to be loaded onto the vessel 9, by adjusting the position of the freight W to be supplied to the vessel 9. This can suppress a harmful effect on the durability of the transporter vehicle 2 that is caused by the biased loading style.

In addition, the shooter 16 needs not have a structure tiltable in the rotational direction around the rotational axis parallel to the X-axis, and may have a structure tiltable in the rotational direction around the rotational axis parallel to the Y-axis, for example. In addition, the shooter 16 may have an immovable structure. In addition, the shooter 16 may have a structure that can adjust the loading style in the transporter vehicle 2. In addition, the shooter 16 may be omitted.

In addition, the conveyance unit 11C of the first conveyance mechanism 11 needs not be inclined upward toward the feeding unit 11B, and may be inclined downward toward the feeding unit 11B or may be substantially parallel to the horizontal plane. In addition, the conveyance unit 12C of the second conveyance mechanism 12 needs not be parallel to the horizontal plane, and may be inclined upward toward the feeding unit 12B or may be inclined downward toward the feeding unit 12B. In other words, the conveyance units 11C and 12C may be inclined or parallel as long as the freight W can be input to the hopper 13 from the loader 1 and the freight W can be loaded onto the transporter vehicle 2 from the shooter 16. Accordingly, the conveyance device 10 and the transporter vehicle 2 need not exist on the same ground surface. For example, the ground surface on which the conveyance device 10 exists and the ground surface on which the transporter vehicle 2 exists may be different in height.

Side walls 17 are provided on both sides of the conveyance unit 11C of the first conveyance mechanism 11, and side walls 18 are provided on both sides of the conveyance unit 12C of the second conveyance mechanism 12. The side walls 17 prevent the freight W being conveyed by the first conveyance mechanism 11, from dropping from the conveyance unit 11C. The side walls 18 prevent the freight W being conveyed by the second conveyance mechanism 12, from dropping from the conveyance unit 12C.

The weight detection device 20 detects weight of the freight W loaded on the second conveyance mechanism 12. In the present embodiment, the weight detection device 20 detects the weight of the freight W supported on the conveyor 15. In other words, the weight detection device 20 detects the total weight of the freight W loaded on the conveyance surface of the apron 15B. The weight detection device 20 includes a load cell provided on a shaft that rotatably supports the sprockets 15A, for example. In addition, the weight detection device 20 may be a hydraulic cylinder provided on a support unit (not illustrated) supporting the conveyor 15. If the hydraulic cylinder detects the weight of the freight W, the weight of the freight W is detected based on hydraulic pressure of the hydraulic cylinder. In addition, the weight detection device 20 may be an optical sensor that detects the shape of the freight W in a noncontact manner by emitting detection light onto the freight W loaded on the conveyance surface of the apron 15B. If the optical sensor detects the weight of the freight W, the weight of the freight W is calculated based on volume derived from the shape of the freight W that has been detected by the optical sensor, and known density of the freight W. The weight detection device 20 transmits a detection value of the weight of the freight W to the control apparatus 30.

In the present embodiment, the conveyance device 10 is a portable (preferably self-propelled) conveyance device. The travel apparatus 70 movably supports the conveyance device 10. The travel apparatus 70 includes crawler tracks 71. The crawler tracks 71 are respectively disposed below the first conveyance mechanism 11 and below the second conveyance mechanism 12. The travel apparatus 70 is operated by drive force generated by a drive source 72. The drive source 72 includes an internal-combustion engine such as a diesel engine, for example. In addition, the drive source 72 may include a generator that generates power by the operation of the internal-combustion engine, and an electrical motor that operates based on the power generated by the generator. Alternatively, an external power source may be used. If the drive source 72 is operated, the crawler tracks 71 rotate. By the rotation of the crawler tracks 71, the travel apparatus 70 supporting the conveyance device 10 travels.

Because the conveyance device 10 is movable, the conveyance device 10 can be moved in accordance with the movement of the loader 1 that is associated with the progress in a mining work, an excavation work, or a loading work in the mine. Thus, the loader 1 and the conveyance device 10 can smoothly execute a loading work at an arbitrary position in the loading site. In addition, the conveyance device 10 may include a relative position sensor that can detect a relative position relative to the loader 1, and a geomorphological sensor that can detect a landform of the surrounding of the conveyance device 10. Based on detection results of the relative position sensor and the geomorphological sensor, the conveyance device 10 is moved in such a manner that the hopper 13 is disposed at a position appropriate for the loader 1 executing a loading work. This can enhance work efficiency of the loader 1.

In addition, the travel apparatus 70 needs not be self-propelled, and the drive source 72 may be omitted. For example, the travel apparatus 70 may be moved by being towed by the loader 1 or a tractor. In addition, the travel apparatus 70 may have tires in place of the crawler tracks 71.

The control apparatus 30 controls the operation of the conveyance device 10. The control apparatus 30 includes a computer system. The control apparatus 30 is supported on a frame of the conveyance device 10, for example.

Control Apparatus

Figure 3:
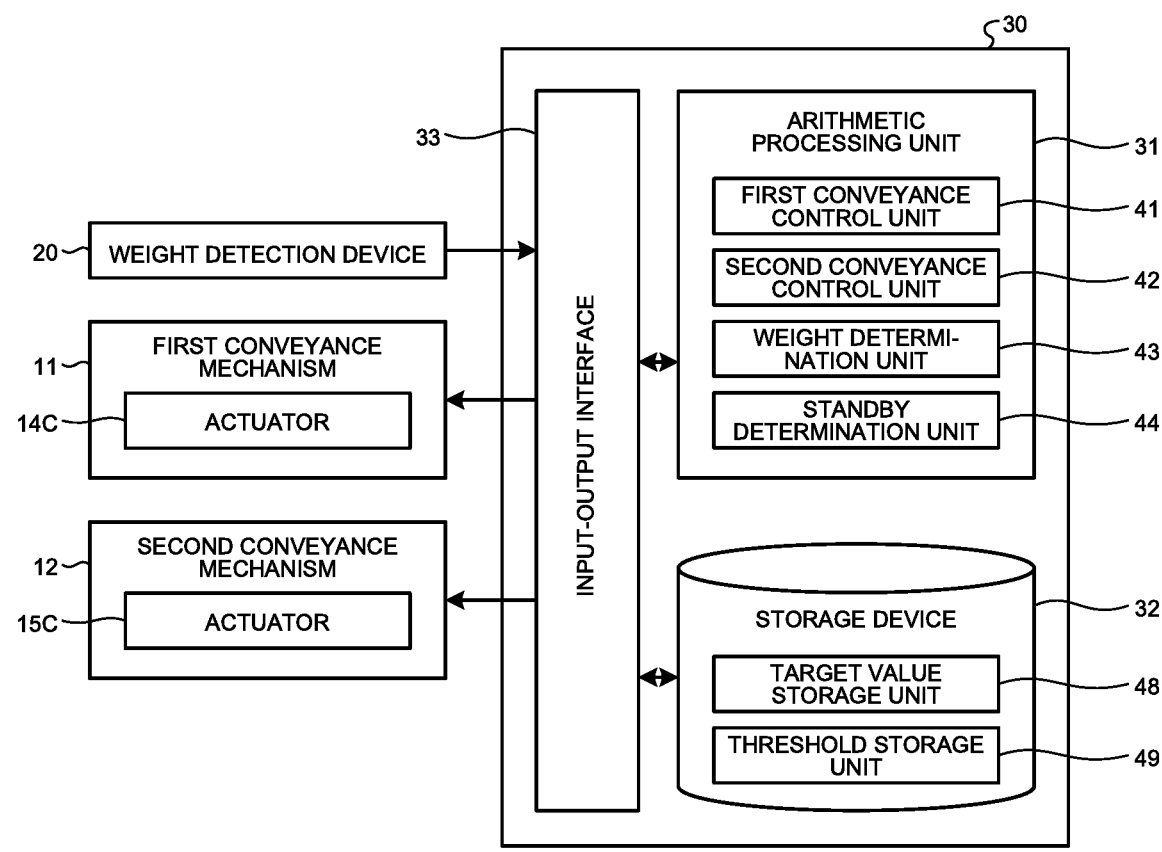
FIG. 3 is a functional block diagram illustrating an example of a control apparatus according to the first embodiment.

FIG. 3 is a functional block diagram illustrating an example of the control apparatus 30 according to the present embodiment. The control apparatus 30 includes an arithmetic processing unit 31 including a processor such as a central processing unit (CPU), a storage device 32 including a memory and a storage such as a read only memory (ROM) or a random access memory (RAM), and an input-output interface 33.

The input-output interface 33 can communicate with the weight detection device 20, the actuator 14C of the first conveyance mechanism 11, and the actuator 15C of the second conveyance mechanism 12. A detection signal indicating a detection value of the weight detection device 20 is transmitted to the input-output interface 33. A control signal for controlling the actuator 14C of the first conveyance mechanism 11 and a control signal for controlling the actuator 15C of the second conveyance mechanism 12 are output from the input-output interface 33.

The arithmetic processing unit 31 includes a first conveyance control unit 41, a second conveyance control unit 42, a weight determination unit 43, and a standby determination unit 44.

The first conveyance control unit 41 controls a conveyance operation of the first conveyance mechanism 11. The first conveyance control unit 41 controls a start and an end of the conveyance operation of the first conveyance mechanism 11 by outputting a control signal for controlling the actuator 14C of the first conveyance mechanism 11. The start of the conveyance operation of the first conveyance mechanism 11 refers to setting the conveyance speed of the first conveyance mechanism 11 to a positive value from zero. The stop of the conveyance operation of the first conveyance mechanism 11 refers to setting the conveyance speed of the first conveyance mechanism 11 to zero. In addition, the first conveyance control unit 41 controls the conveyance speed of the first conveyance mechanism 11 by outputting a control signal for controlling the actuator 14C of the first conveyance mechanism 11.

The second conveyance control unit 42 controls a conveyance operation of the second conveyance mechanism 12. The second conveyance control unit 42 controls a start and an end of the conveyance operation of the second conveyance mechanism 12 by outputting a control signal for controlling the actuator 15C of the second conveyance mechanism 12. The start of the conveyance operation of the second conveyance mechanism 12 refers to setting the conveyance speed of the second conveyance mechanism 12 to a positive value from zero. The stop of the conveyance operation of the second conveyance mechanism 12 refers to setting the conveyance speed of the second conveyance mechanism 12 to zero. In addition, the second conveyance control unit 42 controls the conveyance speed of the second conveyance mechanism 12 by outputting a control signal for controlling the actuator 15C of the second conveyance mechanism 12.

Based on a detection value of the weight detection device 20, the weight determination unit 43 determines whether the weight of the freight W loaded on the second conveyance mechanism 12 has reached a target value. The target value of the weight of the freight W indicates the weight of the freight W to be loaded onto one transporter vehicle 2 in one loading work performed by the second conveyance mechanism 12. One loading work performed by the second conveyance mechanism 12 refers to a work of moving the conveyance unit 12C of the second conveyance mechanism 12 by the operation of the actuator 15C, by a movement amount corresponding to a distance between the receiving unit 12A and the feeding unit 12B, and loading the freight W loaded on the second conveyance mechanism 12, onto the transporter vehicle 2 existing at the loading position P2. The target value is defined based on the maximum loading amount of the transporter vehicle 2. The maximum loading amount of the transporter vehicle 2 refers to the maximum limit weight of the freight W defined for the transporter vehicle 2. The maximum loading amount is known data. The target value defined based on the maximum loading amount is stored into a target value storage unit 48 of the storage device 32. Based on the target value stored in the target value storage unit 48, the weight determination unit 43 determines whether the weight of the freight W loaded on the second conveyance mechanism 12 has reached the target value.

In addition, data indicating the maximum loading amount of the transporter vehicle 2 may be transmitted from the transporter vehicle to the control apparatus 30 via a communication system. Based on the maximum loading amount transmitted from the transporter vehicle 2, the weight determination unit 43 may determine whether the weight of the freight W loaded on the second conveyance mechanism 12 has reached the target value. If a plurality of transporter vehicles 2 being different in the maximum loading amount is used, data indicating the maximum loading amount may be transmitted for each of the transporter vehicles 2. Alternatively, if a plurality of transporter vehicles 2 being different in the maximum loading amount is used, the maximum loading amounts of the transporter vehicles 2 may be recognized from a management system that manages the travel of the transporter vehicles 2, and a target value may be defined. In addition, if identification information (identification: ID) is allocated to the transporter vehicle 2, the maximum loading amount of the transporter vehicle 2 may be recognized based on the identification information, and a target value may be defined. In addition, if a payload meter is mounted on the transporter vehicle 2, surplus soil data of the vessel 9 may be transmitted to the control apparatus 30. Even after an operation for discharging the freight W (for example, sediment) loaded on the vessel 9 by the transporter vehicle 2 is executed in a soil discharge site or the like, the weight sometimes does not become exactly zero due to the freight W (for example, sediment) attached to the vessel 9 or the like. Thus, a target value may be determined based on the maximum loading amount of the transporter vehicle 2 and the surplus soil data.

In addition, based on a detection value of the weight detection device 20, the weight determination unit 43 determines whether the weight of the freight W loaded on the second conveyance mechanism 12 has reached a threshold smaller than the target value. The threshold of the weight of the freight W is predefined known data. The threshold is stored into a threshold storage unit 49 of the storage device 32. Based on the threshold stored in the threshold storage unit 49, the weight determination unit 43 determines whether the weight of the freight W loaded on the second conveyance mechanism 12 has reached the threshold.

In addition, the threshold is a value smaller than the target value but may be a value equal to the target value.

The standby determination unit 44 determines whether the transporter vehicle 2 exists at the loading position P2. In other words, the standby determination unit 44 determines whether the transporter vehicle 2 is waiting at the loading position P2. Based on a result obtained by the standby determination unit 44 determining whether the transporter vehicle 2 exists at the loading position P2, the second conveyance control unit 42 controls the second conveyance mechanism 12. In the present embodiment, a standby signal indicating that the transporter vehicle 2 exists at the loading position P2 is transmitted from the transporter vehicle 2 to the control apparatus 30 via the communication system. For example, when the transporter vehicle 2 stops at the loading position P2, a driver of the transporter vehicle 2 may operate an operating device provided in the transporter vehicle 2 and generate a standby signal. By the standby signal generated by the operation of the operating device being transmitted to the control apparatus 30 via the communication system, the standby determination unit 44 can determine whether the transporter vehicle 2 exists at the loading position P2.

In addition, a position sensor that can detect the position of the transporter vehicle 2 may be provided in the transporter vehicle 2, and when the transporter vehicle 2 stops at the loading position P2, a detection signal indicating that the transporter vehicle 2 exists at the loading position P2 may be transmitted from the position sensor to the control apparatus 30 via the communication system. If the position of the loading position P2 in a global coordinate system is known and the position sensor is a Global Positioning System (GPS) sensor that can detect the position of the transporter vehicle 2 in the global coordinate system, the standby determination unit 44 can determine whether the transporter vehicle 2 exists at the loading position P2, based on the known position of the loading position P2 and a detection signal of the position sensor that indicates the position of the transporter vehicle 2. For example, if a state in which the position of the loading position P2 and the position of the transporter vehicle 2 that is detected by the position sensor match is maintained for a predefined time or more, the standby determination unit 44 may determine that the transporter vehicle 2 exists at the loading position P2. In addition, a report system that reports that the transporter vehicle 2 arrives at the loading position P2, from the management system that manages the travel of the transporter vehicle 2 may be provided.

In addition, the conveyance system 100 may include an existence sensor that detects whether the transporter vehicle 2 exists at the loading position P2. The existence sensor may be an optical sensor that can optically detect whether the transporter vehicle 2 exists at the loading position P2, by emitting detection light onto the loading position P2, for example. Based on a detection signal of the existence sensor, the standby determination unit 44 can determine whether the transporter vehicle 2 exists at the loading position P2.

Conveyance Method

Figure 4:
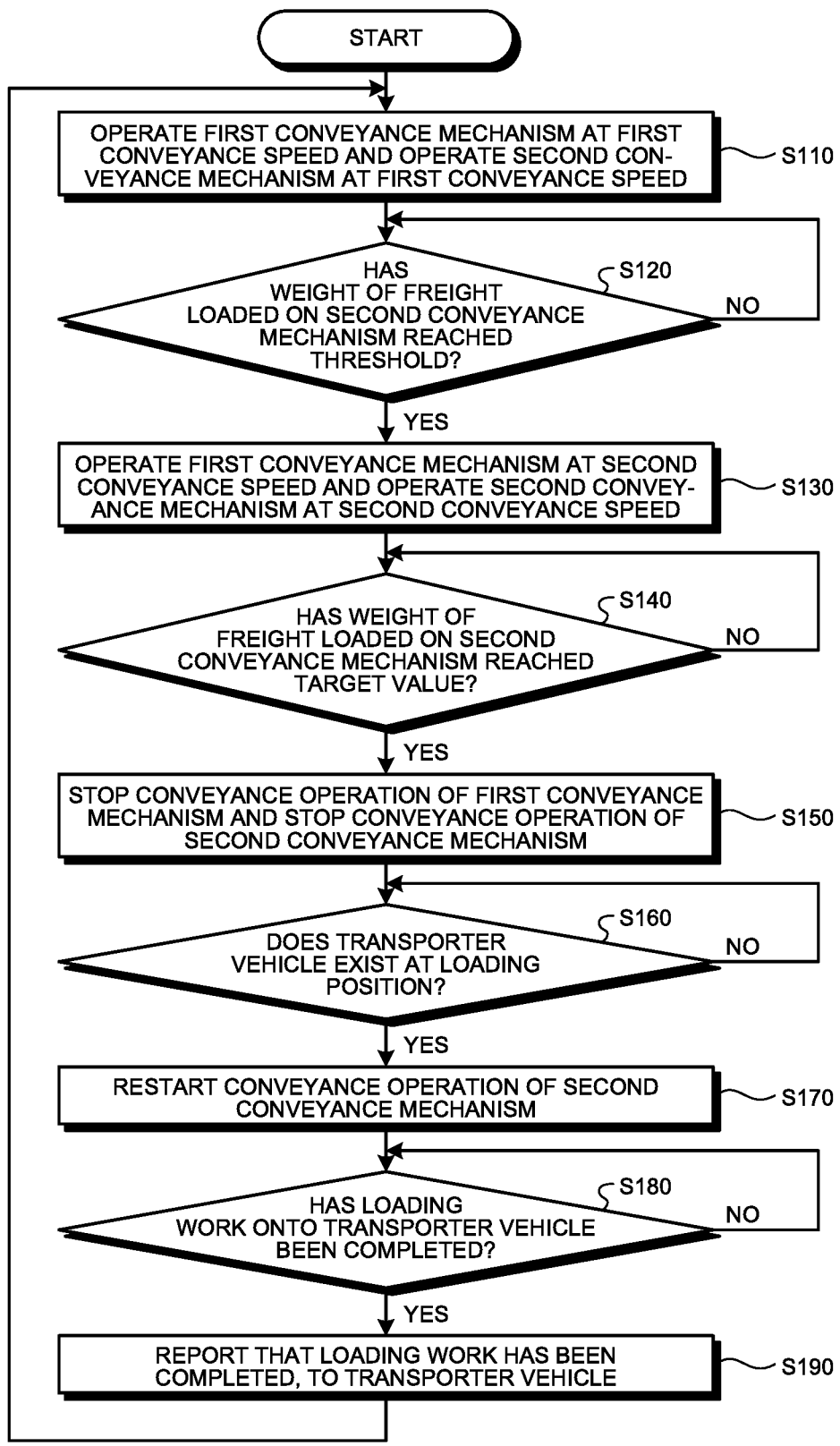
FIG. 4 is a flowchart illustrating an example of a conveyance method according to the first embodiment.
Figure 5:
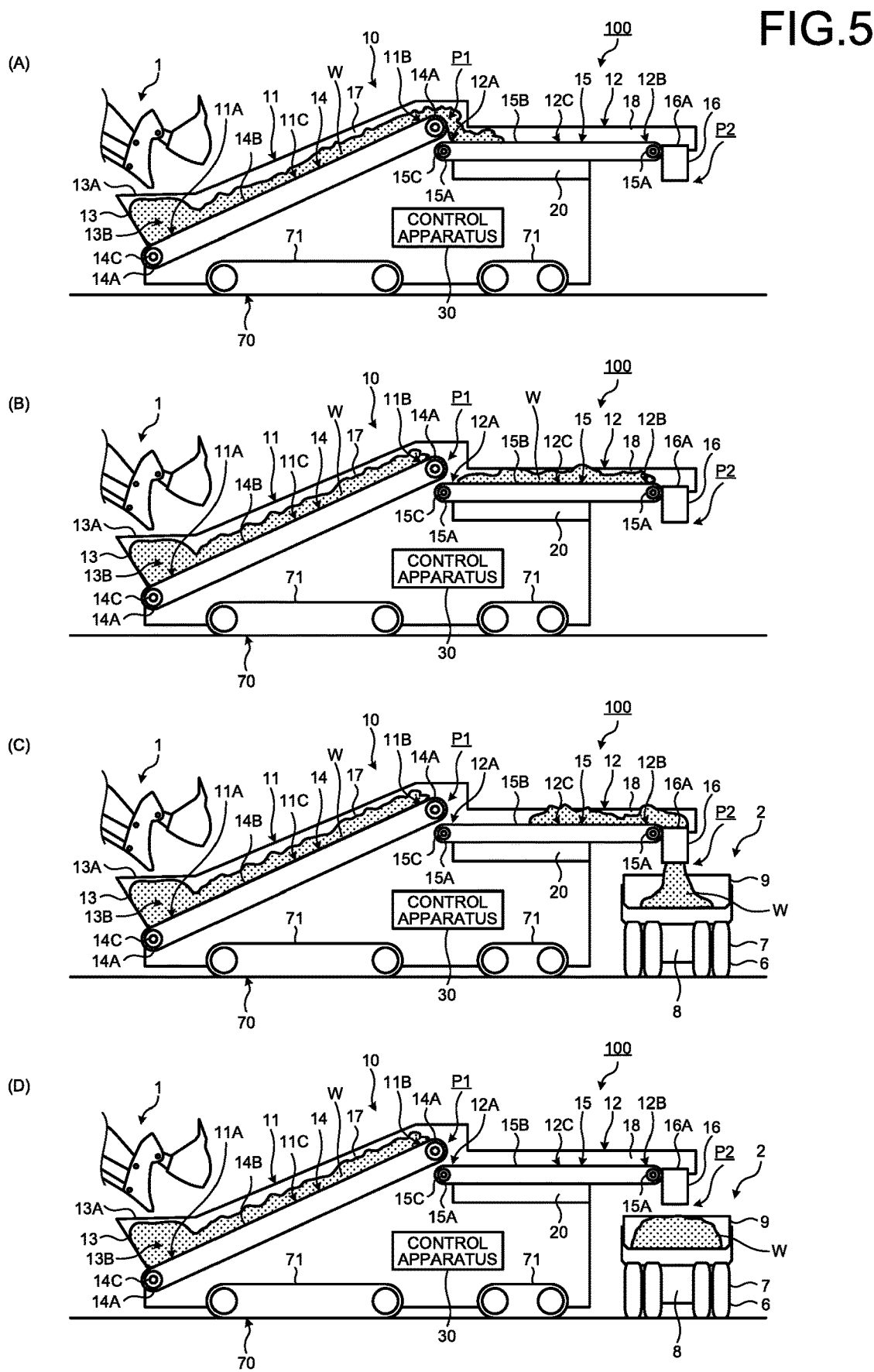
FIG. 5 is a diagram schematically illustrating an example of an operation of the conveyance system according to the first embodiment.

Next, an example of a conveyance method according to the present embodiment will be described. FIG. 4 is a flowchart illustrating an example of a conveyance method according to the present embodiment. FIG. 5 is a diagram schematically illustrating an example of an operation of the conveyance system 100 according to the present embodiment.

The conveyance method according to the present embodiment includes controlling at least the conveyance operation of the first conveyance mechanism 11 based on a detection value of the weight of the freight W loaded on the second conveyance mechanism 12 that conveys the freight W supplied from the loader 1 via the first conveyance mechanism 11, to the loading position P2.

In starting the supply of the freight W to the first conveyance mechanism 11 by the loader 1, or if the supply of the freight W is started, the first conveyance control unit 41 outputs a control signal for starting the conveyance operation of the first conveyance mechanism 11, and the second conveyance control unit 42 outputs a control signal for starting the conveyance operation of the second conveyance mechanism 12.

In addition, the conveyance operation of the first conveyance mechanism 11 and the conveyance operation of the second conveyance mechanism 12 may be simultaneously started, the conveyance operation of the second conveyance mechanism 12 may be started after the conveyance operation of the first conveyance mechanism 11 is started, or the conveyance operation of the first conveyance mechanism 11 may be started after the conveyance operation of the second conveyance mechanism 12 is started.

For example, activation switches respectively corresponding to the first conveyance mechanism 11 and the second conveyance mechanism 12 are provided in the conveyance device 10, and by the operation of these activation switches, the first conveyance control unit 41 and the second conveyance control unit 42 output control signals for starting the conveyance operation of the first conveyance mechanism 11 and the conveyance operation of the second conveyance mechanism 12.

Alternatively, when the driver of the loader 1 starts the supply of the freight W to the first conveyance mechanism 11, the driver may generate a start signal indicating the start of the loading work, by operating an operating device provided in the loader 1. The start signal generated by the operation of the operating device is transmitted to the control apparatus 30 via the communication system. The first conveyance control unit 41 and the second conveyance control unit 42 can thereby determine that the loader 1 starts the supply of the freight W to the first conveyance mechanism 11, and output a control signal for starting the conveyance operation of the first conveyance mechanism 11 and a control signal for starting the conveyance operation of the second conveyance mechanism.

In addition, a weight sensor that can detect the weight of the freight W loaded on the first conveyance mechanism 11 may be provided, and based on a detection value of the weight sensor, it may be determined whether the loader 1 has started the supply of the freight W to the first conveyance mechanism 11. A detection value of the weight sensor varies after the supply of the freight W to the first conveyance mechanism 11 is started, from that of before the supply is started. Thus, when it is determined that the supply of the freight W to the first conveyance mechanism 11 is started by the loader 1, based on the detection value of the weight sensor, the first conveyance control unit 41 and the second conveyance control unit 42 can output a control signal for starting the conveyance operation of the first conveyance mechanism 11 and a control signal for starting the conveyance operation of the second conveyance mechanism.

The weight detection device 20 starts the detection of the weight of the freight W loaded on the second conveyance mechanism 12. A detection value of the weight of the freight W that has been detected by the weight detection device 20 is transmitted to the control apparatus 30 at a prescribed cycle. The weight determination unit 43 monitors the detection value of the weight detection device 20.

The first conveyance control unit 41 operates the first conveyance mechanism 11 at a first conveyance speed. In addition, the second conveyance control unit 42 operates the second conveyance mechanism 12 at the first conveyance speed (Step S110).

In other words, in the present, embodiment, the first conveyance control unit 41 outputs a control signal to the actuator 14C of the first conveyance mechanism 11 and the second conveyance control unit 42 outputs a control signal to the actuator 15C of the second conveyance mechanism 12 in such a manner that the first conveyance mechanism 11 and the second conveyance mechanism 12 operate at the same conveyance speed (first conveyance speed).

In the present embodiment, the conveyance speed of the first conveyance mechanism 11 is the conveyance speed of the freight W conveyed by the conveyor 14. The conveyance speed of the second conveyance mechanism 12 is the conveyance speed of the freight W conveyed by the conveyor 15.

The freight W input to the input port 13A from the loader 1 is temporarily reserved in the hopper 13. The conveyor 14 of the first conveyance mechanism 11 continuously conveys the freight W supplied from the hopper 13. The freight W is conveyed from the receiving unit 11A to the feeding unit 11B.

The first conveyance speed is decided based on at least one of an area of the conveyance unit 11C of the first conveyance mechanism 11 (the conveyance surface of the apron 14B), an area of the conveyance unit 12C of the second conveyance mechanism 12 (the conveyance surface of the apron 15B), a target value of the weight of the freight W, a loading speed of the loader 1, and a cycle time of the transporter vehicle 2.

The loading speed of the loader 1 refers to the weight of the freight W that can be supplied per unit time by the loader 1 to the first conveyance mechanism 11, more specifically, to the hopper 13. The loading speed of the loader 1 varies based on the size of the bucket 5C, a swing speed of the swing body 4, and the like.

The cycle time of the transporter vehicle 2 refers to a time interval at which the transporter vehicle 2 arrives at the loading position P2. The cycle time is based on a time required for a series of works of the transporter vehicle 2 in which the transporter vehicle 2 arrives at the loading position P2, and the transporter vehicle 2 on which the freight W is loaded travels to a destination such as a soil discharge site and discharges the freight W at the destination, and then, returns to the loading position P2, for example, and the number of transporter vehicles 2 that travel. If a time required for one loading work is shortened, a cycle time is shortened.

For example, if the first conveyance speed is low even though the cycle time is short, even when the transporter vehicle 2 arrives at the loading position P2, the transporter vehicle 2 needs to wait for a loading work until the supply of the freight W is started. On the other hand, if the first conveyance speed is high even though the cycle time is long, even when the freight W is conveyed by the conveyance device 10, the conveyance device 10 needs to wait for a loading work onto the transporter vehicle 2 until the next transporter vehicle 2 arrives at the loading position P2. Nevertheless, in this case, by utilizing a buffer function included in the conveyance device 10, the loader 1 can continue freight input to the conveyance device 10 and deterioration in productivity can be suppressed.

In the present embodiment, the first conveyance speed is optimized based on at least one of the area of the conveyance unit 11C of the first conveyance mechanism 11, the area of the conveyance unit 12C of the second conveyance mechanism 12, a target value of the weight of the freight W, a loading speed of the loader 1, and a cycle time of the transporter vehicle 2. This can suppress deterioration in productivity in the mine.

The freight W conveyed to the feeding unit 11B of the first conveyance mechanism 11 is supplied to the receiving unit 12A of the second conveyance mechanism 12. The freight W fed by the feeding unit 11B of the first conveyance mechanism 11 drops to the receiving unit 12A of the second conveyance mechanism 12 by the action of gravitational force. The freight W is thereby supplied from the first conveyance mechanism 11 to the second conveyance mechanism 12.

The conveyor 15 of the second conveyance mechanism 12 continuously conveys the freight W supplied from the first conveyance mechanism 11. The freight W supplied to the receiving unit 12A is conveyed to the feeding unit 12B.

FIG. 5(A) illustrates a state in which the freight W conveyed by the first conveyance mechanism 11 is supplied to the second conveyance mechanism 12. As illustrated in FIG. 5(A), the first conveyance mechanism 11 continuously conveys the freight W and continuously supplies the freight W to the second conveyance mechanism 12. Thus, the weight of the freight W loaded on the second conveyance mechanism 12 gradually increases. The second conveyance mechanism 12 continuously conveys the freight W supplied from the first conveyance mechanism 11.

In the present embodiment, the first conveyance mechanism 11 and the second conveyance mechanism 12 convey the freight W at the same conveyance speed (first conveyance speed). Thus, as long as the freight W is reserved in the hopper 13, the freight W is continuously conveyed in a contiguous state.

In addition, the first conveyance mechanism 11 and the second conveyance mechanism 12 may be operated at different conveyance speeds. The conveyance speed of the first conveyance mechanism 11 may be higher or lower than the conveyance speed of the second conveyance mechanism 12.

Based on a detection value of the weight detection device 20 and the threshold stored in the threshold storage unit 49, the weight determination unit 43 determines whether the weight of the freight W loaded on the second conveyance mechanism 12 has reached the threshold (Step S120).

The weight detection device 20 detects the weight of the freight W loaded on the second conveyance mechanism 12, at a prescribed cycle, and transmits a detection value to the control apparatus 30. The weight determination unit 43 monitors the detection value of the weight of the freight W loaded on the conveyance unit 12C of the second conveyance mechanism 12, and determines the weight of the freight W at a prescribed cycle.

When it is determined in Step S120 that the weight of the freight W loaded on the second conveyance mechanism 12 is equal to or less than the threshold (Step S120: No), the processing returns to the process in Step S120. In other words, the first conveyance control unit 41 operates the first conveyance mechanism 11 at the first conveyance speed and the second conveyance control unit 42 operates the second conveyance mechanism 12 at the first conveyance speed.

When it is determined in Step S120 that the weight of the freight W loaded on the second conveyance mechanism 12 has reached the threshold (Step S120: Yes), the first conveyance control unit 41 operates the first conveyance mechanism 11 at a second conveyance speed. In addition, the second conveyance control unit 42 operates the second conveyance mechanism 12 at the second conveyance speed (Step S130).

The second conveyance speed is a conveyance speed lower than the first conveyance speed. In other words, the first conveyance control unit 41 and the second conveyance control unit 42 decelerate the conveyance speed of the first conveyance mechanism 11 and the conveyance speed of the second conveyance mechanism 12. In the present embodiment, the second conveyance speed gradually decreases along with the lapse of time. The first conveyance control unit 41 gradually decelerates the first conveyance mechanism 11 in accordance with a detection value of the weight of the freight W that has been detected by the weight detection device 20, and the target value of the weight of the freight W. In addition, the second conveyance speed needs not be a value varying along with the lapse of time, and may be a fixed value lower than the first conveyance speed.

The first conveyance control unit 41 outputs a control signal to the actuator 14C of the first conveyance mechanism 11 and the second conveyance control unit 42 outputs a control signal to the actuator 15C of the second conveyance mechanism 12 in such a manner that the first conveyance mechanism 11 and the second conveyance mechanism 12 decelerate to the same conveyance speed (second conveyance speed).

In addition, the conveyance speed of the first conveyance mechanism 11 and the conveyance speed of the second conveyance mechanism 12 may be different from each other. In addition, the conveyance speed of the first conveyance mechanism 11 may be decelerated without decelerating the conveyance speed of the second conveyance mechanism 12.

After the conveyance speed of the first conveyance mechanism 11 and the conveyance speed of the second conveyance mechanism 12 are decelerated, based on a detection value of the weight detection device 20 and the target value stored in the target value storage unit 48, the weight determination unit 43 determines whether the weight of the freight W loaded on the second conveyance mechanism 12 has reached the target value (Step S140).

When it is determined in Step S140 that the weight of the freight W loaded on the second conveyance mechanism 12 is equal to or less than the target value (Step S140: No), the processing returns to the process in Step S140. In other words, the first conveyance control unit 41 and the second conveyance control unit 42 continue the conveyance operations in a state in which the conveyance speeds of the first conveyance mechanism 11 and the second conveyance mechanism 12 are decelerated.

When it is determined in Step S140 that the weight of the freight W loaded on the second conveyance mechanism 12 has reached the target value (Step S140: Yes), the first conveyance control unit 41 stops the conveyance operation of the first conveyance mechanism 11. In addition, the second conveyance control unit 42 stops the conveyance operation of the second conveyance mechanism 12 (Step S150).

FIG. 5(B) illustrates a state in which, after the detection value of the weight of the freight W loaded on the second conveyance mechanism 12 has reached the target value, the conveyance operation of the first conveyance mechanism 11 and the conveyance operation of the second conveyance mechanism 12 are stopped. When the detection value of the weight of the freight W loaded on the second conveyance mechanism 12 has reached the target value and the conveyance operation of the first conveyance mechanism 11 and the conveyance operation of the second conveyance mechanism 12 stop, as illustrated in FIG. 5(B), the freight W is loaded over almost the entire region of the conveyance unit 12C of the second conveyance mechanism 12.

An area of the conveyance unit 12C of the second conveyance mechanism 12 (the placement surface of the apron 15B) is defined based on the target value of the weight of the freight W. In the present embodiment, an area of the conveyance unit 12C is defined in such a manner that the freight W is loaded over the entire region of the conveyance unit 12C when the freight W is loaded on the conveyance unit 12C in the weight of the target value. In the present embodiment, the target value of the weight of the freight W is the maximum loading amount of the transporter vehicle 2. The area of the conveyance unit 12C is defined in such a manner that the weight of the freight W loaded over the entire region of the conveyance unit 12C becomes the maximum loading amount of the transporter vehicle 2.

Figure 6:
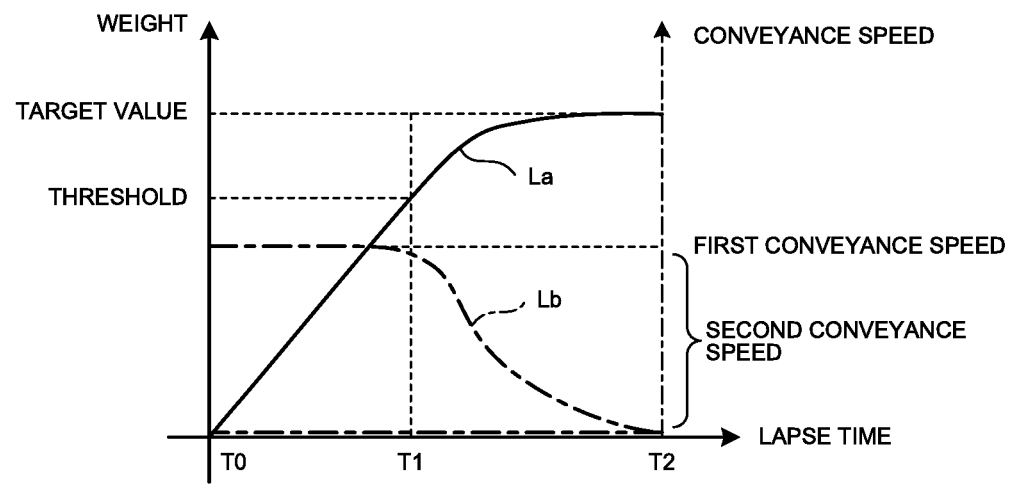
FIG. 6 is a diagram illustrating relationship between weight of freight, a conveyance speed, and a lapse time from when the freight is supplied, according to the first embodiment.

FIG. 6 is a diagram illustrating a relationship between the weight of the freight W loaded on the second conveyance mechanism 12, the conveyance speed of the second conveyance mechanism 12, and a lapse time from when the freight W is supplied from the first conveyance mechanism 11 to the second conveyance mechanism 12, according to the present embodiment. In addition, the conveyance speed of the first conveyance mechanism 11 is equal to the conveyance speed of the second conveyance mechanism 12. In a graph illustrated in FIG. 6, a horizontal axis indicates a lapse time from when the supply of the freight W from the feeding unit 11B to the receiving unit 12A is started. A vertical axis indicates the weight of the freight W loaded on the second conveyance mechanism 12 and the conveyance speed of the second conveyance mechanism 12. In FIG. 6, a line La indicates a detection value of the weight of the freight W that is detected by the weight detection device 20, and a line Lb indicates the conveyance speed of the second conveyance mechanism 12.

In FIG. 6, a time point T0 is a time point at which the supply of the freight W from the feeding unit 11B to the receiving unit 12A is started. By the freight W being supplied from the first conveyance mechanism 11 to the second conveyance mechanism 12, a detection value of the weight detection device 20 gradually increases. In addition, FIG. 6 illustrates an example in which the conveyance operation of the second conveyance mechanism 12 is started at the time point T0 at which the freight W is supplied from the first conveyance mechanism 11 to the second conveyance mechanism 12. At the time point T0, the second conveyance mechanism 12 starts the operation at the first conveyance speed.

At a time point T1 at which it is determined that the detection value of the weight detection device 20 has reached the threshold, the second conveyance control unit 42 decelerates the conveyance speed of the second conveyance mechanism 12. In the present embodiment, the second conveyance speed is a variable value gradually decreasing along with the lapse of time. In addition, the second conveyance speed may be a fixed value. In the present embodiment, the second conveyance control unit 42 gradually decelerates the conveyance speed of the second conveyance mechanism 12. Similarly to the conveyance speed of the second conveyance mechanism 12, the conveyance speed of the first conveyance mechanism 11 is also gradually decelerated.

In addition, at a time point T2 at which it is determined that the detection value of the weight detection device 20 has reached the target value, the second conveyance control unit 42 stops the conveyance operation of the second conveyance mechanism 12 and sets the conveyance speed to zero.

For example, when the detection value of the weight detection device 20 has reached the target value, if the conveyance speeds of the first conveyance mechanism 11 and the second conveyance mechanism 12 are set straight to zero from the first conveyance speed, a part of the freight W loaded on the first conveyance mechanism 11 drops to the second conveyance mechanism 12 by inertial force and is loaded onto the second conveyance mechanism 12, and the weight of the freight W loaded on the second conveyance mechanism 12 may exceed the target value. In addition, if the conveyance speeds of the first conveyance mechanism 11 and the second conveyance mechanism 12 are set straight to zero from the first conveyance speed, a part of the freight. W loaded on the second conveyance mechanism 12 spills out from the second conveyance mechanism 12 by inertial force, and the weight of the freight W loaded on the second conveyance mechanism 12 may fall below the target value. In this manner, if the conveyance speeds of the first conveyance mechanism 11 and the second conveyance mechanism 12 are set straight to zero from the first conveyance speed, the weight of the freight W loaded on the second conveyance mechanism 12 may fail to be accurately managed.

In the present embodiment, when the detection value of the weight detection device 20 has reached the threshold before the detection value of the weight detection device 20 reaches the target value, the conveyance operations are executed by decelerating the conveyance speeds of the first conveyance mechanism 11 and the second conveyance mechanism 12 from the first conveyance speed to the second conveyance speed. In other words, by setting the threshold to a value smaller than the target value, the conveyance system 100 suppresses a rapid decrease in the conveyance speeds of the first conveyance mechanism 11 and the second conveyance mechanism 12. This can reduce an error between the detection value of the weight of the freight W loaded on the second conveyance mechanism 12 and the target value, after the conveyance operations of the first conveyance mechanism 11 and the second conveyance mechanism 12 are stopped.

If the threshold is increased, the conveyance speed is not sufficiently decelerated when the detection value reaches the target value, and a part of the freight W becomes more likely to drop from the first conveyance mechanism 11 to the second conveyance mechanism 12, or a part of the freight W becomes more likely to drop from the second conveyance mechanism 12. If the threshold is decreased, a time until the first conveyance mechanism 11 and the second conveyance mechanism 12 stop becomes longer, and deterioration in productivity may be caused. The threshold is set to a value at which the drop of the freight W and deterioration in productivity are suppressed, or a value at which the drop of the freight W and deterioration in productivity are not generated.

After the process in Step S150, the standby determination unit 44 determines whether the transporter vehicle 2 exists at the loading position P2 (Step S160). As described above, the standby determination unit 44 can determine whether the transporter vehicle 2 exists at the loading position P2, based on at least one of the standby signal transmitted from the transporter vehicle 2, the detection signal of the position sensor of the transporter vehicle 2, and the detection signal of the existence sensor that detects whether the transporter vehicle 2 exists at the loading position P2, for example.

In addition, if an operator of the conveyance device 10 exists, the determination as to whether the transporter vehicle 2 exists at the loading position P2 may be executed by the operator.

When it is determined in Step S160 that the transporter vehicle 2 does not exist at the loading position P2 (Step S160: No), the processing returns to the process in Step S160. In other words, a state in which the conveyance operation of the first conveyance mechanism 11 is stopped, and a state in which the conveyance operation of the second conveyance mechanism 12 is stopped are continued.

When it is determined in Step S160 that the transporter vehicle 2 exists at the loading position P2 (Step S160: Yes), the second conveyance control unit 42 restarts the conveyance operation of the second conveyance mechanism 12 that conveys the freight W loaded on the second conveyance mechanism 12, to the loading position P2, in a state in which the conveyance operation of the first conveyance mechanism 11 is stopped, and causes the second conveyance mechanism 12 to start the loading work onto the transporter vehicle 2 (Step S170).

FIG. 5(C) illustrates a state immediately after the freight W loaded on the second conveyance mechanism 12 is conveyed to the loading position P2 and the loading work onto the transporter vehicle 2 is started by the second conveyance mechanism 12, after the conveyance operation of the first conveyance mechanism 11 is stopped. Because the conveyance operation of the first conveyance mechanism 11 is stopped, in the first conveyance mechanism 11, a state in which the freight W is loaded is maintained. In a state in which the conveyance operation of the second conveyance mechanism 12 is stopped, as illustrated in FIG. 5(B), the freight W in the weight corresponding to the maximum loading amount of the transporter vehicle 2 is loaded on the second conveyance mechanism 12. By the conveyance operation of the second conveyance mechanism 12 being restarted, the freight W loaded on the second conveyance mechanism 12 is fed from the feeding unit 12B and supplied to the transporter vehicle 2. The loading work onto the transporter vehicle 2 existing at the loading position P2 is thereby executed.

In addition, the conveyance speed of the second conveyance mechanism 12 in the process in Step S170 may be the above-described first conveyance speed or needs not be the first conveyance speed. If the conveyance speed of the second conveyance mechanism 12 is set to a speed higher than the first conveyance speed, a time in which the freight W loaded on the second conveyance mechanism 12 is supplied to the transporter vehicle 2 can be shortened.

Based on the detection value of the weight detection device 20, the weight determination unit 43 determines whether the loading work onto the transporter vehicle 2 has been completed by the second conveyance mechanism 12 (Step S180).

Based on the detection value of the weight detection device 20, when the weight determination unit 43 determines that the freight W is not loaded on the second conveyance mechanism 12, the weight determination unit. 43 determines that all of the freight W loaded on the second conveyance mechanism 12 has been loaded onto the transporter vehicle 2.

FIG. 5(D) illustrates a state in which all of the freight W loaded on the second conveyance mechanism 12 has been loaded onto the transporter vehicle 2. As illustrated in FIG. 5(D), when all of the freight W loaded on the second conveyance mechanism 12 has been loaded onto the transporter vehicle 2, the freight W becomes nonexistent on the second conveyance mechanism 12. Thus, based on the detection value of the weight detection device 20, the weight determination unit 43 can determine whether the loading work of loading all of the freight 14 loaded on the second conveyance mechanism 12 onto the transporter vehicle 2 has been completed by the second conveyance mechanism 12.

In addition, based on a lapse time from when the conveyance operation of the second conveyance mechanism 12 is restarted (Step S170), the arithmetic processing unit 31 may determine whether the loading work onto the transporter vehicle 2 has been completed by the second conveyance mechanism 12. For example, when a predetermined time has elapsed from the restart of the conveyance operation of the second conveyance mechanism 12 (Step S170), the arithmetic processing unit 31 may determine that all of the freight W has been loaded onto the transporter vehicle 2. In addition, the lapse time is defined based on the length of the conveyance unit, the conveyance speed, and the like.

Alternatively, if an operator of the conveyance device 10 exists, determination as to whether the loading work onto the transporter vehicle 2 has been completed by the second conveyance mechanism 12 may be executed by the operator.

When it is determined in Step S180 that the loading work onto the transporter vehicle 2 has not been completed by the second conveyance mechanism 12 (Step S180: No), the processing returns to the process in Step S180.

When it is determined in Step S180 that the loading work onto the transporter vehicle 2 has been completed by the second conveyance mechanism 12 (Step S180: Yes), the control apparatus 30 reports that the loading work has been completed, to the transporter vehicle 2 (Step S190).

For example, if the conveyance system 100 includes a report device such as a horn or a signal lamp, the control apparatus 30 can report by sound or light by controlling the report device. In addition, by report data being transmitted from the conveyance system 100 to the transporter vehicle 2, the completion of the loading work may be reported to the transporter vehicle 2.

In addition, the process in Step S190 needs not be executed.

After the completion of the loading work is reported to the transporter vehicle 2, the processing returns to the process in Step S110. In other words, when it is determined that the loading work onto the transporter vehicle 2 has been completed by the second conveyance mechanism 12, the first conveyance control unit 41 restarts the conveyance operation of the first conveyance mechanism 11. The first conveyance control unit 41 operates the first conveyance mechanism 11 at the first conveyance speed and the second conveyance control unit 42 operates the second conveyance mechanism 12 at the first conveyance speed. In addition, if the hopper 13 of the conveyance device 10 exists within a range in which the loading work is executable by the loader 1, and the capacity of the hopper 13 does not exceed an allowable value, the loader 1 can supply the freight W to the first conveyance mechanism 11. For example, irrespective of whether the transporter vehicle 2 exists at the loading position P2 or does not exist, the loader 1 can supply the freight W to the first conveyance mechanism 11.

Hereinafter, the processes from Step S110 to Step S190 are repeated until a command signal for ending the conveyance work of the conveyance device 10 is input to the control apparatus 30.

Effects

As described above, according to the present embodiment, the conveyance system 100 conveys the freight W supplied from the loader 1, to the transporter vehicle 2. The conveyance device 10 includes the first conveyance mechanism 11, and the second conveyance mechanism 12 that can execute a conveyance operation separately from the conveyance operation of the first conveyance mechanism 11. After all of the freight W loaded on the second conveyance mechanism 12 is loaded onto the transporter vehicle 2, even in a state in which the transporter vehicle 2 does not exist at the loading position P2, the loader 1 can supply the freight W to the first conveyance mechanism 11. If the hopper 13 of the conveyance device 10 exists within a range in which the loading work is executable by the loader 1, and the capacity of the hopper 13 does not exceed an allowable value, the loader 1 can continue the loading work of the freight W onto the first conveyance mechanism 11 irrespective of whether the transporter vehicle 2 exists at the loading position P2 or does not exist, for example. In the present embodiment, the hopper 13 is provided, and the freight W supplied from the loader 1 is reserved in the hopper 13 even if the conveyance operation of the first conveyance mechanism 11 is stopped. In other words, the hopper 13 has a buffer function that can receive the freight W supplied from the loader 1, irrespective of whether the transporter vehicle 2 exists at the loading position P2 or not. In addition, irrespective of whether the transporter vehicle 2 exists at the loading position P2 or not, the first conveyance mechanism 11 can convey the freight W to the second conveyance mechanism 12.

Furthermore, because the conveyance device 10 has the buffer function, when matching between a loading amount loaded by the loader 1 and the maximum loading amount of the transporter vehicle 2 is bad, that is to say, also when one loading amount loaded by the loader 1 does not become an integral multiple of the maximum loading amount of the transporter Vehicle 2, the loader 1 can continue to constantly perform a loading work by the maximum amount regardless of the maximum loading amount of the transporter vehicle 2. Thus, productivity is enhanced.

In this manner, irrespective of whether the transporter vehicle 2 exists at the loading position P2 or not, or irrespective of an operation of the transporter vehicle 2, the loader 1 can supply the freight W in the maximum amount to the conveyance system 100. In other words, in the present embodiment, by the buffer function of the conveyance system 100, even if the transporter vehicle 2 does not exist at the loading position 92, the loader 1 can continue a loading work onto the conveyance system 100 with the maximum amount. Thus, a wait time of the loader 1 and inefficiency of matching are suppressed, and deterioration in work efficiency of the loader 1 is suppressed. Accordingly, enhancement in productivity in the mine is expected.

In addition, by the buffer function of the conveyance system 100, a weight detection function, and a function that can hold the freight W supplied from the loader 1 using at least one of the first conveyance mechanism 11 and the second conveyance mechanism 12, the conveyance system 100 can supply the freight W in appropriate weight to the transporter vehicle 2 disposed at the loading position P2, in a state in which influence on the loading speed of the loader 1 is suppressed or a state in which there is no influence. Accordingly, because a wait time of the transporter vehicle 2 is suppressed, and deterioration in the operating rate of the transporter vehicle 2 is suppressed, deterioration in productivity in the mine is suppressed.

In addition, according to the present embodiment, the weight of the freight W loaded on the second conveyance mechanism 12 is detected by the weight detection device 20. At least one of the conveyance operation of the first conveyance mechanism 11 and the conveyance operation of the second conveyance mechanism 12 is controlled based on the detection value of the weight detection device 20. In the existing method of using only a loader and a transporter vehicle, it is extremely difficult to manage the weight of freight to be loaded onto the transporter vehicle because matching between a loading amount loaded by the loader 1 and the maximum loading amount of the transporter vehicle 2 and specific weight of freight are not constant. Nevertheless, in the present embodiment, the weight of the freight W to be loaded onto the transporter vehicle 2 is appropriately managed. Thus, deficiency in a loading amount of the freight W to be loaded onto the transporter vehicle 2 and an excessive loading amount of the freight W are suppressed. Accordingly, a variation in travel speed among a plurality of transporter vehicles 2 operating in the mine is suppressed. Because a variation in travel speed among a plurality of transporter vehicles 2 is suppressed, for example, the occurrence of congestion of the transporter vehicles 2 that is attributed to the transporter vehicle 2 with low travel speed is suppressed. By the occurrence of congestion being suppressed, deterioration in the conveyance efficiency of the transporter vehicle 2 is suppressed, and deterioration in productivity in the mine is suppressed.

In addition, according to the present embodiment, an excessive loading amount of the freight W to be loaded onto the transporter vehicle 2 is suppressed. Thus, excessive load to be applied to at least part of the transporter vehicle 2 and the tires 6 is suppressed. Accordingly, deterioration in durability of the transporter vehicle 2 is suppressed.

In addition, according to the present embodiment, when it is determined that the detection value of the weight detection device 20 has reached the target value, the conveyance operation of the first conveyance mechanism 11 is stopped and the conveyance operation of the second conveyance mechanism 12 is stopped. After the conveyance operation of the first conveyance mechanism 11 and the conveyance operation of the second conveyance mechanism 12 are stopped, the conveyance operation of the second conveyance mechanism 12 that conveys the freight W loaded on the second conveyance mechanism 12, to the loading position P2 is restarted. The freight W can thereby be loaded onto the transporter vehicle 2 in the weight of the target value.

In addition, in the present embodiment, the process in Step S120 and the process in Step S130 may be omitted.

In addition, in the present embodiment, in Step S150, the conveyance operation of the second conveyance mechanism 12 needs not be stopped. For example, when it is determined that the transporter vehicle 2 exists at the loading position P2, the second conveyance control unit 42 needs not stop the conveyance operation of the second conveyance mechanism 12.

Second Embodiment

A second embodiment will be described. In the following description, components that are the same as or similar to those in the above-described embodiment are assigned the same reference numerals and the description thereof will be simplified or omitted.

Figure 7:
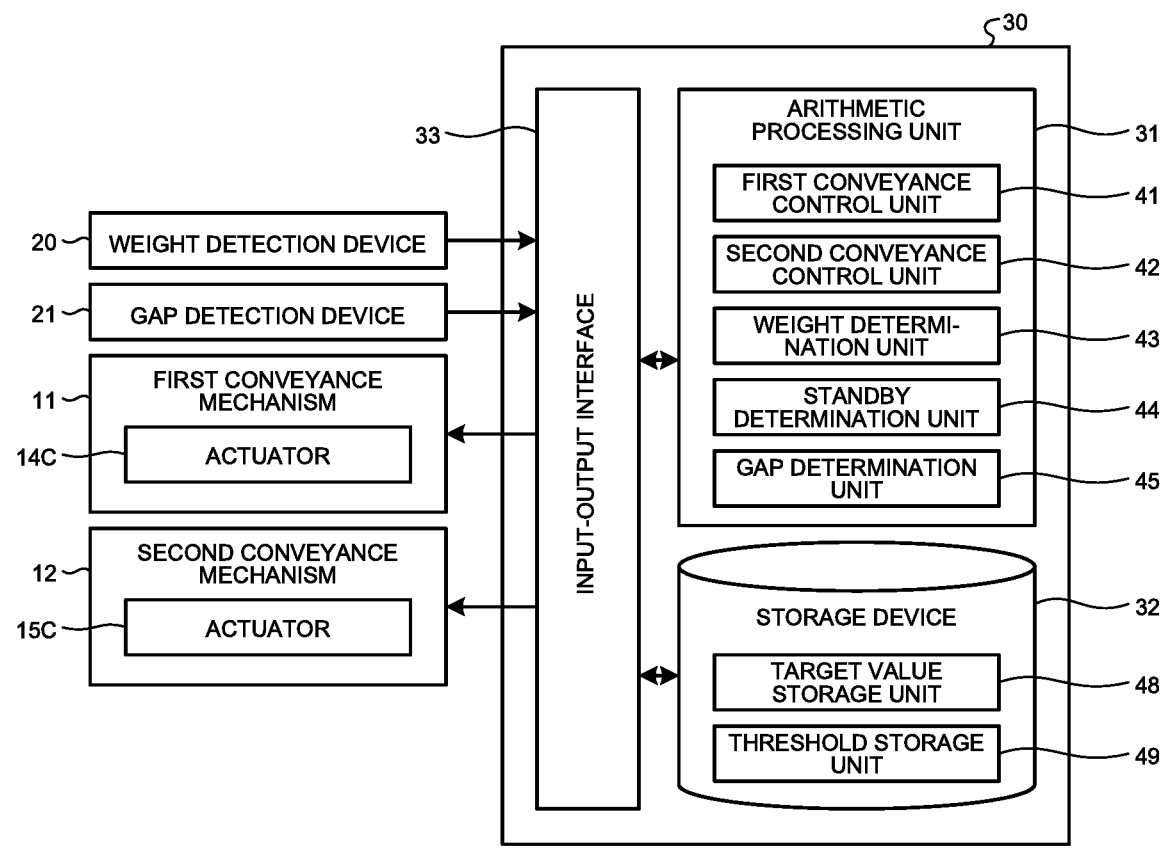
FIG. 7 is a functional block diagram illustrating an example of a control apparatus according to a second embodiment.

FIG. 7 is a functional block diagram illustrating an example of a control apparatus according to the present embodiment. As illustrated in FIG. 7, in the present embodiment, the conveyance system 100 includes a gap detection device 21 that detects a gap G of the freight W conveyed by the conveyor 14 of the first conveyance mechanism 11. The gap G of the freight W refers to a portion in the conveyor 14 (the conveyance unit 11C) in which the freight W is not continuously supplied and the freight W does not exist. The portion is generated between the freight W and the freight W.

For example, when the freight W is not sufficiently reserved in the hopper 13, if the conveyance operation of the first conveyance mechanism 11 is continued, the freight W may fail to be continuously conveyed and may be intermittently conveyed. If the freight W is intermittently conveyed, the gap G of the freight W is formed on the conveyor 14. When the gap G is formed in the freight W conveyed by the conveyor 14, the gap detection device 21 detects the gap G of the freight W.

The gap detection device 21 optically detects the freight W conveyed by the conveyor 14, for example, in a noncontact manner. The gap detection device 21 includes an irradiation unit that emits detection light onto the freight W conveyed by the conveyor 14, and a light receiving unit that receives detection light reflected by the freight W. A light receiving state of detection light to be received by the light receiving unit varies between a state in which the freight W is loaded on the conveyor 14, and a state in which the freight W is not loaded on the conveyor 14. Based on the light receiving state of detection light to be received by the light receiving unit, the gap detection device 21 can detect the existence or non-existence of the freight W on the conveyor 14.

The gap detection device 21 transmits a detection result to the control apparatus 30. Based on the detection result of the gap detection device 21, the control apparatus 30 controls the conveyance operation of the second conveyance mechanism 12.

The arithmetic processing unit 31 includes a gap determination unit 45 that determines whether there is the gap G in the freight W conveyed by the conveyor 14, based on the detection result of the gap detection device 21. The second conveyance control unit 42 controls the conveyance operation of the second conveyance mechanism 12 based on the determination result of the gap determination unit 45. In the present embodiment, when it is determined that there is the gap G in the freight W, the second conveyance control unit 42 stops the conveyance operation of the second conveyance mechanism 12 in a state in which the conveyance operation of the first conveyance mechanism 11 is continued.

Figure 8:
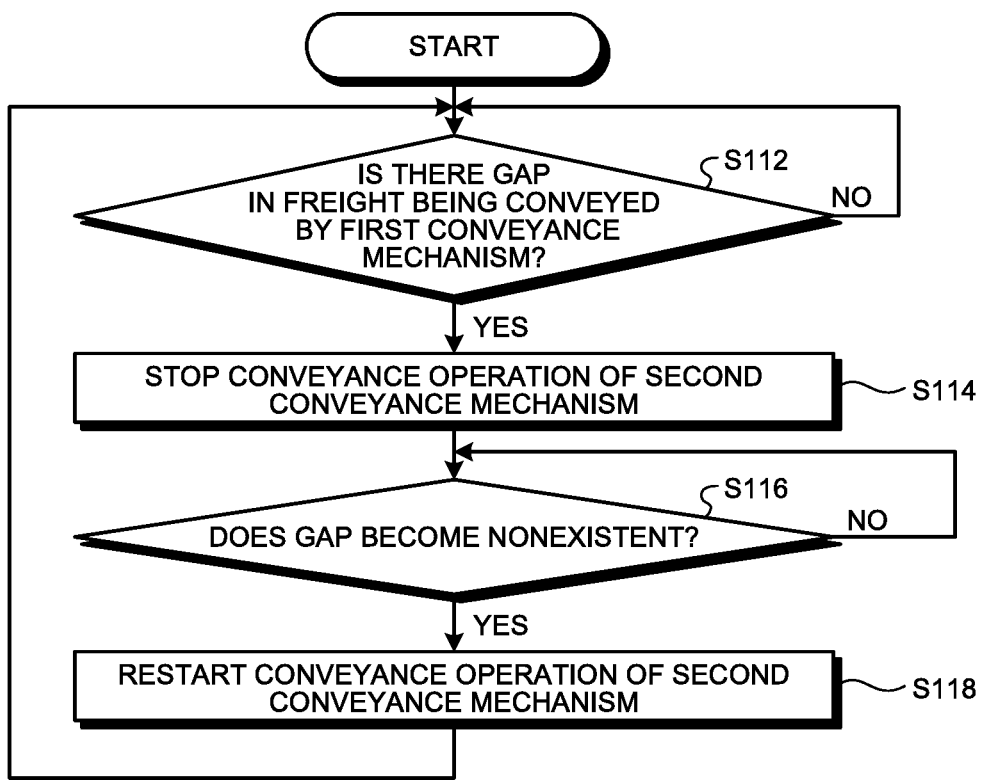
FIG. 8 is a flowchart illustrating an example of a conveyance method according to the second embodiment.
Figure 9:
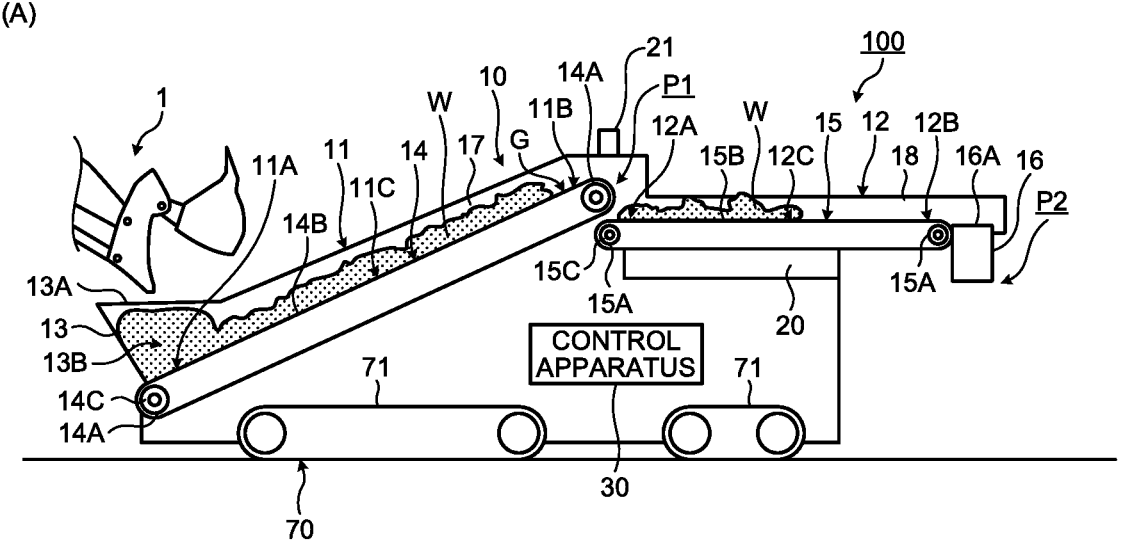
FIG. 9 is a diagram schematically illustrating an example of an operation of a conveyance system according to the second embodiment.
Figure 9:
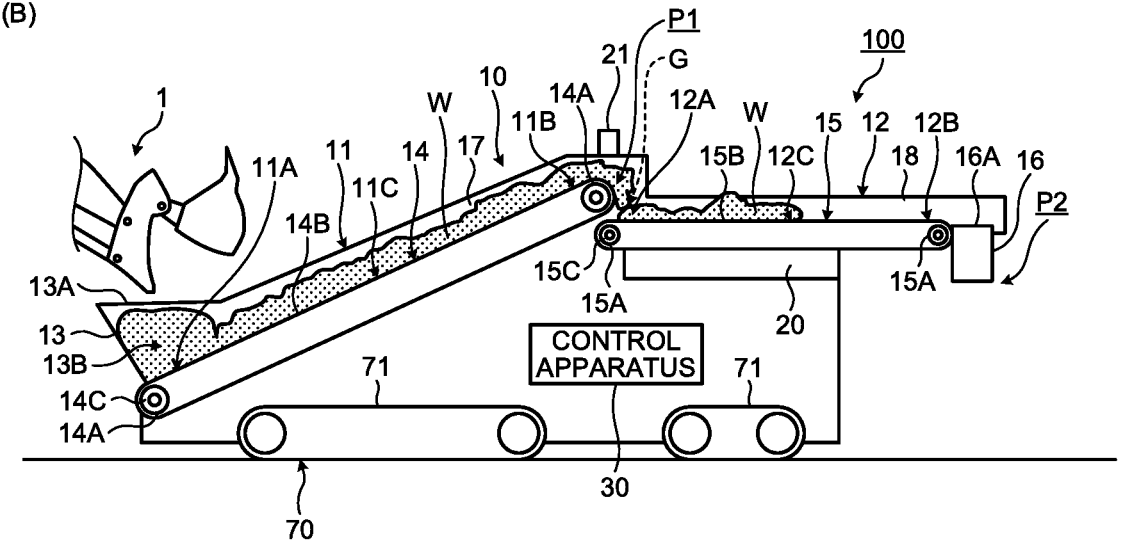

FIG. 8 is a flowchart illustrating an example of a conveyance method according to the present embodiment. FIG. 9 is a diagram schematically illustrating an example of an operation of the conveyance system 100 according to the present embodiment. In addition, a series of processes (Step S112 to Step S118) illustrated in the flowchart in FIG. 8 are processes to be always executed in an interposed manner in a period in which the processes in Step S110 to Step S120 that have been described in the above-described first embodiment are executed.

The process in Step S110 that has been described with reference to FIG. 4 is executed. In other words, after the freight W is loaded into the hopper 13 by the loader 1, the first conveyance control unit 41 operates the first conveyance mechanism 11 at the first conveyance speed and the second conveyance control unit 42 operates the second conveyance mechanism 12 at the first conveyance speed.

The gap detection device 21 detects the gap G of the freight W conveyed by the conveyor 14 of the first conveyance mechanism 11.

FIG. 9(A) illustrates a state in which the gap G is formed in the freight W conveyed by the first conveyance mechanism 11. For example, if the freight W is not sufficiently supplied to the conveyor 14 from the hopper 13 or if an operation of supplying the freight W from the loader 1 to the hopper 13 is interrupted, as illustrated in FIG. 9(A), the freight W is not continuously conveyed and the gap G is formed.

The gap detection device 21 optically detects the gap G of the freight W at the receiving position P1. If the gap G exists at the feeding unit 11B of the conveyor 14, the gap, detection device 21 transmits a detection result indicating that there is the gap G, to the control apparatus 30.

The gap determination unit 45 determines whether there is the gap G in the freight W conveyed by the first conveyance mechanism 11, based on the detection result of the gap detection device 21 (Step S112).

For example, when it is determined that a size of the gap G in the conveyance direction of the first conveyance mechanism 11 is a predefined threshold or more, the gap determination unit 45 determines that there is the gap G.

When it is determined in Step S112 that there is the gap G (Step S112: Yes), the first conveyance control unit 41 continues the conveyance operation of the first conveyance mechanism 11, and the second conveyance control unit 42 stops the conveyance operation of the second conveyance mechanism 12 (Step S114).

FIG. 9(B) illustrates a state in which, after the gap G is detected at the feeding unit 11B, the conveyance operation of the second conveyance mechanism 12 is stopped in a state in which the conveyance operation of the first conveyance mechanism 11 is continued. As illustrated in FIG. 9(B), the freight W supplied from the first conveyance mechanism 11 is loaded on a part of the second conveyance mechanism 12. If the gap G is detected at the feeding unit 11B, the conveyance operation of the second conveyance mechanism 12 is stopped. In a state in which the conveyance operation of the second conveyance mechanism 12 is stopped, the freight W is loaded at least on the receiving unit 12A of the second conveyance mechanism 12.

The first conveyance control unit 41 and the second conveyance control unit 42 control the first conveyance mechanism 11 and the second conveyance mechanism 12 in such a manner that the freight W conveyed by the first conveyance mechanism 11 and the freight W loaded on the second conveyance mechanism 12 are connected. By the conveyance operation of the first conveyance mechanism 11 being continued in a state in which the conveyance operation of the second conveyance mechanism 12 is stopped, as illustrated in FIG. 9(B), the freight W loaded on the first conveyance mechanism 11 is conveyed to the feeding unit 11B and then, supplied to the receiving unit 12A of the second conveyance mechanism 12. The freight W conveyed by the first conveyance mechanism 11 and the freight W loaded on the second conveyance mechanism 12 are thereby connected, and the gap G becomes nonexistent.

Based on the detection result of the gap detection device 21, the gap determination unit 45 determines whether the gap G at the feeding unit 11B becomes nonexistent (Step S116).

When it is determined in Step S116 that the gap G does not become nonexistent (Step S116: No), the conveyance operation of the first conveyance mechanism 11 is continued, and a state in which the conveyance operation of the second conveyance mechanism 12 is stopped is maintained.

When it is determined in Step S116 that the gap G becomes nonexistent (Step S116: Yes), the second conveyance control unit 42 restarts the conveyance operation of the second conveyance mechanism 12 in a state in which the conveyance operation of the first conveyance mechanism 11 is continued (Step S118).

The first conveyance mechanism 11 and the second conveyance mechanism 12 are operated at the first conveyance speed. In the first conveyance mechanism 11 and the second conveyance mechanism 12, the freight W is continuously conveyed.

When it is determined in Step S112 that there is not the gap G (Step S112: No), the conveyance operation of the second conveyance mechanism 12 is not stopped, and the process in Step S120 that has been described with reference to FIG. 4 is executed.

As described above, according to the present embodiment, the gap G of the freight W at the feeding unit 11B is detected, and when the gap G is detected, the conveyance operation of the second conveyance mechanism 12 is controlled. In the present embodiment, when the gap G is detected, the control apparatus 30 stops the conveyance operation of the second conveyance mechanism 12 in a state in which the conveyance operation of the first conveyance mechanism 11 is continued. The freight W conveyed by the first conveyance mechanism 11 and the freight W loaded on the second conveyance mechanism 12 can thereby be connected. Accordingly, formation of the gap G of the freight W on the second conveyance mechanism 12 is suppressed.

If a state in which the gap G of the freight W is formed on the first conveyance mechanism 11 is left, the gap G of the freight W is eventually formed on the second conveyance mechanism 12. As described above, when an area of the conveyance unit 12C of the second conveyance mechanism 12 (placement surface of the apron 15B) is optimized based on the target value of the weight of the freight W, if the gap G is formed on the second conveyance mechanism 12, the freight W in the weight of the target value may fail to be all loaded onto the second conveyance mechanism 12, and a part of the freight W may spill out from the second conveyance mechanism 12. In addition, also when the gap G is formed, if an area of the conveyance unit 12C of the conveyor 15 of the second conveyance mechanism 12 is increased, or the dimension of the conveyor 15 in the conveyance direction of the second conveyance mechanism 12 is increased, for loading all of the freight W in the weight of the target value onto the second conveyance mechanism 12, excessive upsizing of the second conveyance mechanism 12 is caused.

In the present embodiment, if the gap G of the freight W is detected on the first conveyance mechanism 11, the conveyance operation of the second conveyance mechanism 12 is controlled in such a manner that the gap G becomes nonexistent on the second conveyance mechanism 12. This suppresses the formation of the gap G on the second conveyance mechanism 12 even if the gap G is formed on the first conveyance mechanism 11. Accordingly, even when the area of the conveyance unit 12C is optimized, the freight W in the weight of the target value can be loaded onto the second conveyance mechanism 12.

In addition, in the present embodiment, when the gap G is detected, the conveyance operation of the second conveyance mechanism 12 is stopped in a state in which the conveyance operation of the first conveyance mechanism 11 is continued. When the gap G is detected, the conveyance speed of the second conveyance mechanism 12 may be decreased in a state in which the conveyance operation of the first conveyance mechanism 11 is continued.

Third Embodiment

A third embodiment will be described. In the following description, components that are the same as or similar to those in the above-described embodiment are assigned the same reference numerals and the description thereof will be simplified or omitted.

Figure 10:
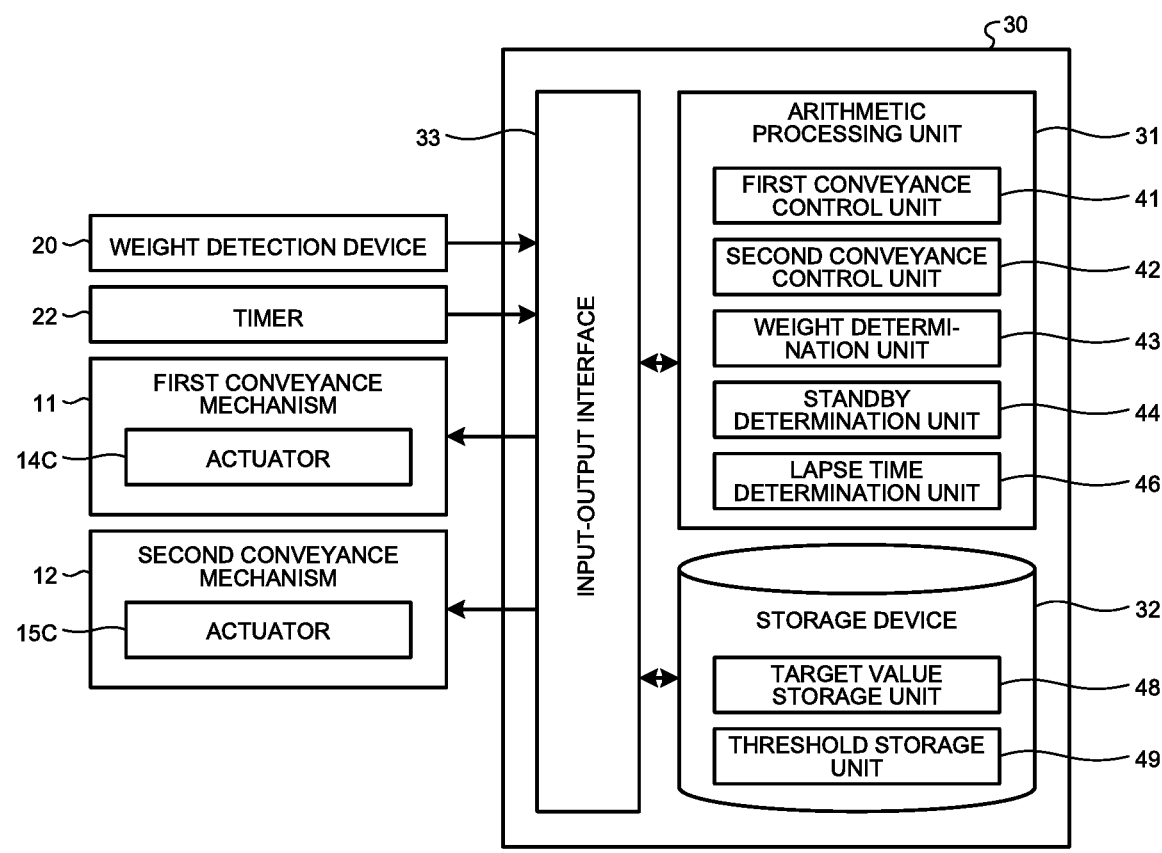
FIG. 10 is a functional block diagram illustrating an example of a control apparatus according to a third embodiment.

FIG. 10 is a functional block diagram illustrating an example of a control apparatus 30 according to the present embodiment. As illustrated in FIG. 10, in the present embodiment, the conveyance system 100 includes a timer 22 that measures a lapse time from a specified time point. The timer 22 measures a lapse time from a specified time point specified by the control apparatus 30, for example. A measurement result of the timer 22 is transmitted to the control apparatus 30. In the present embodiment, the timer 22 is provided on the outside of the control apparatus 30, but a lapse time may be measured by a timer included in the control apparatus 30.

The arithmetic processing unit 31 includes a lapse time determination unit 46 that determines whether a lapse time from the specified time point passes a predefined specified time, based on the measurement result of the timer 22. The first conveyance control unit 41 controls the conveyance operation of the first conveyance mechanism 11 based on the determination result of the lapse time determination unit 46.

Figure 11:
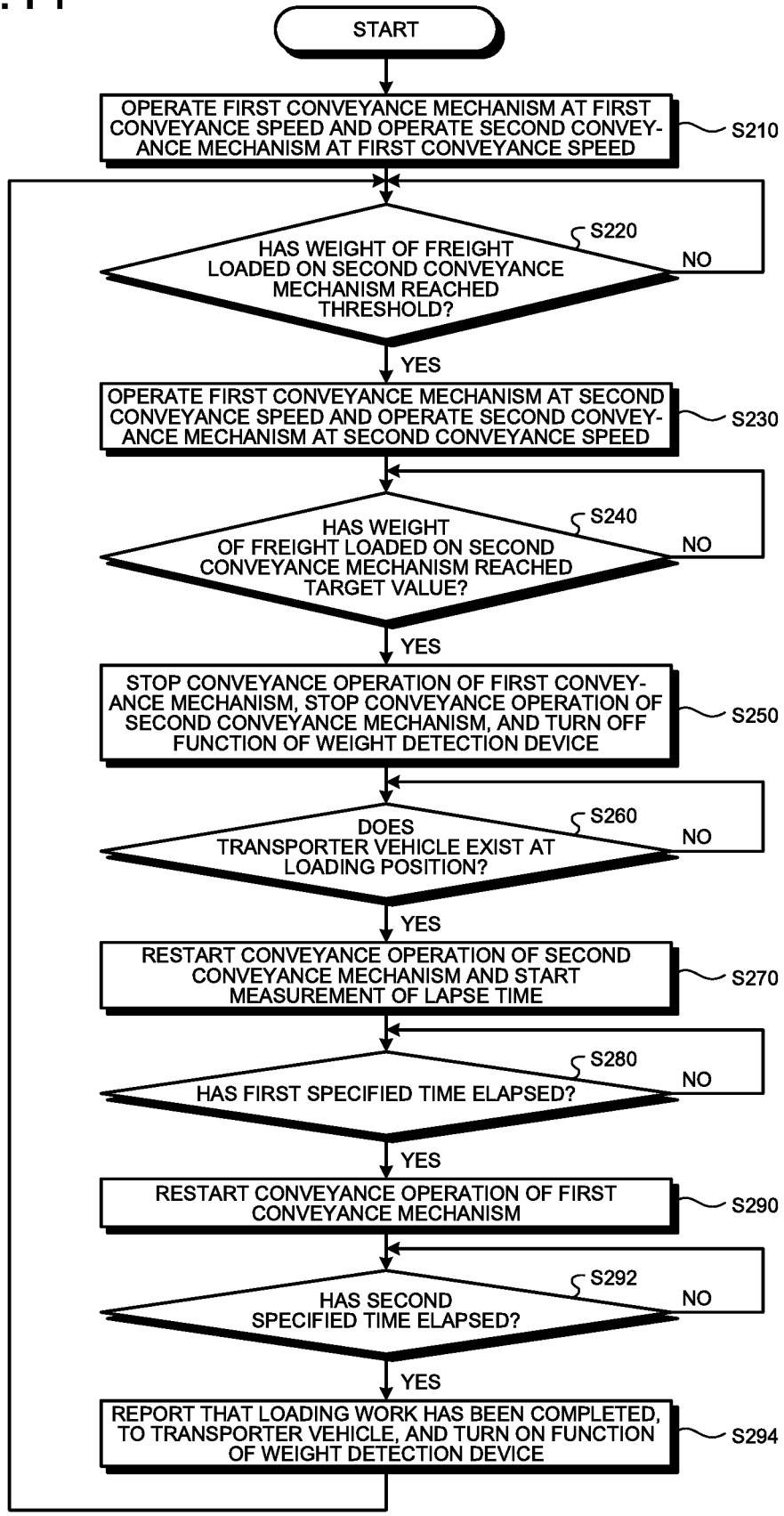
FIG. 11 is a flowchart illustrating an example of a conveyance method according to the third embodiment.
Figure 12:
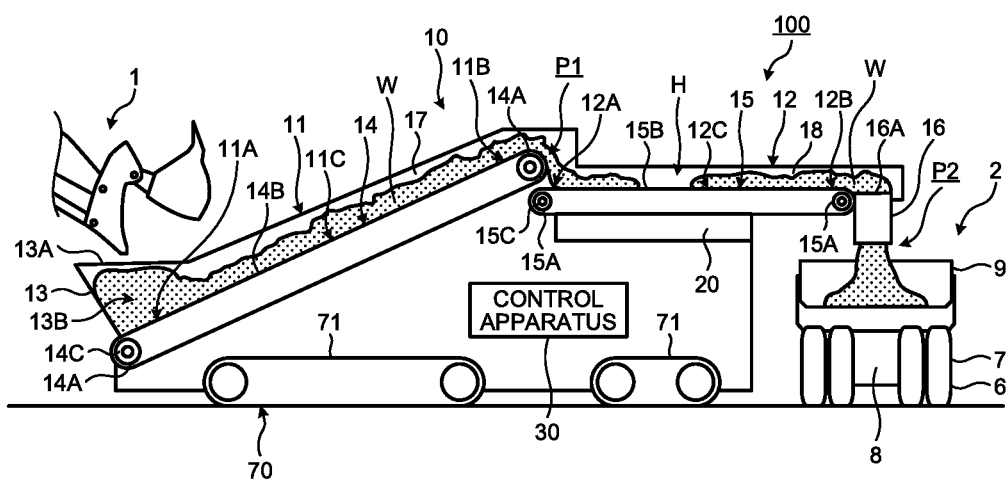
FIG. 12 is a diagram schematically illustrating an example of an operation of a conveyance system according to the third embodiment.
Figure 12:
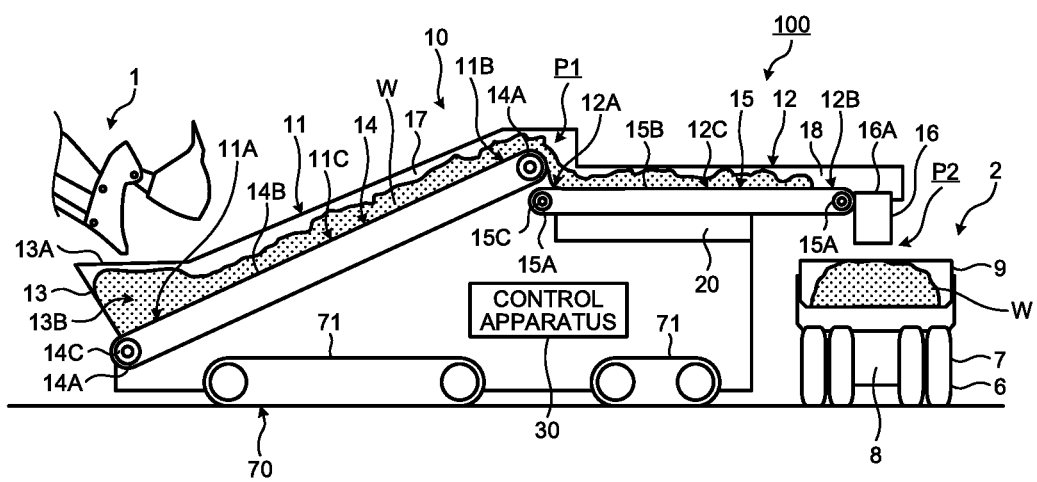

FIG. 11 is a flowchart illustrating an example of a conveyance method according to the present embodiment. FIG. 12 is a diagram schematically illustrating an example of an operation of the conveyance system 100 according to the present embodiment. In addition, in the flowchart illustrated in FIG. 11, because the processes in Step S210 to Step S240 are similar to the processes in Step S110 to Step S140 that have been described in the above-described first embodiment, the description thereof will be simplified or omitted.

When it is determined in Step S240 that the weight of the freight W leaded on the second conveyance mechanism 12 has reached the target value (Step S240: Yes), the first conveyance control unit 41 stops the conveyance operation of the first conveyance mechanism 11, and the second conveyance control unit 42 stops the conveyance operation of the second conveyance mechanism 12. In addition, the control apparatus 30 turns off the detection function of the weight detection device 20 (Step S250).

Turning off the detection function of the weight detection device 20 includes at least one of stopping the detection performed by the weight detection device 20, the control apparatus 30 not performing the acquisition of the detection value of the weight detection device 20, and not performing determination of the weight determination unit 43 that is based on the detection value of the weight detection device 20.

The standby determination unit 44 determines whether the transporter vehicle 2 exists at the loading position P2 (Step S260). The process in Step S260 is similar to the process in Step S160 that has been described in the above-described first embodiment.

When it is determined in Step S260 that the transporter vehicle 2 does not exist at the loading position P2 (Step S260: No), the processing returns to the process in Step S260. In other words, a state in which the conveyance operation of the first conveyance mechanism 11 is stopped, and a state in which the conveyance operation of the second conveyance mechanism 12 is stopped are continued.

When it is determined in Step S260 that the transporter vehicle 2 exists at the loading position P2 (Step S260: Yes), the second conveyance control unit 42 restarts the conveyance operation of conveying the freight W loaded on the second conveyance mechanism 12, to the loading position P2, in a state in which the conveyance operation of the first conveyance mechanism 11 is stopped. In addition, the second conveyance control unit 42 causes the timer 22 to measure a lapse time from when the conveyance operation of the second conveyance mechanism 12 is restarted. The timer 22 starts the measurement of the lapse time (Step S270).

Based on the measurement result of the timer 22, the lapse time determination unit 46 determines whether a lapse time from when the conveyance operation of the second conveyance mechanism 12 is restarted has passed a predefined first specified time (Step S280).

The first specified time is set based on a time required for the remaining part of the freight W loaded on the second conveyance mechanism 12 being conveyed to the loading position P2. At the time point at which the first specified time elapses, a part of the freight W remains on the second conveyance mechanism 12. In other words, the first specified time is set to a time shorter than a time from when a loading work of loading the freight W loaded on the second conveyance mechanism 12 onto the transporter vehicle 2 existing at the loading position P2 is started by the second conveyance mechanism 12 to when the loading work is completed. In other words, the first specified time is a time for providing a predetermined interval between the freight W to be loaded onto the transporter vehicle 2 from the second conveyance mechanism 12, and the freight W to be loaded onto the next transporter vehicle 2.

When it is determined in Step S280 that the first specified time has not elapsed (Step S280: No), the conveyance operation is continued by the second conveyance mechanism 12 in a state in which the conveyance operation of the first conveyance mechanism 11 is stopped.

When it is determined in Step S280 that the first specified time has elapsed (Step S280: Yes), the first conveyance control unit 41 restarts the conveyance operation of the first conveyance mechanism 11 (Step S290).

FIG. 12(A) illustrates a state of the freight after the lapse of the first specified time. As illustrated in FIG. 12(A), at the time point at which the first specified time elapses, a part of the freight W loaded on the second conveyance mechanism 12 is loaded onto the transporter vehicle 2, and the remaining part of the freight W is loaded on the second conveyance mechanism 12. In addition, because the conveyance operation of the first conveyance mechanism 11 is restarted, the freight W supplied from the first conveyance mechanism 11 is loaded onto a part of the second conveyance mechanism 12. On the second conveyance mechanism 12, a blank portion H of the freight W is formed. Because the blank portion H of the freight W is formed, the conveyance system 100 can load the freight W loaded on a region in the conveyance device 10 that is provided closer to the loading position P2 than the blank portion H, onto a preceding transporter vehicle 2, and then, smoothly load the freight W loaded on a region provided farther from the loading position P2 than the blank portion H, onto the next transporter vehicle 2. In other words, by the blank portion H, the freight W to be loaded onto the preceding transporter vehicle 2 and the freight W to be loaded onto the next transporter vehicle 2 can be segmented.

Based on the measurement result of the timer 22, the lapse time determination unit 46 determines whether a lapse time from when the conveyance operation of the second conveyance mechanism 12 is restarted passes a predefined second specified time (Step S292).

The second specified time is set based on a time required for all of the freight W loaded on the second conveyance mechanism 12 being conveyed to the loading position P2. At the time point at which the second specified time elapses, all of the freight W loaded on the second conveyance mechanism 12 at the time point at which the conveyance operation of the second conveyance mechanism 12 is restarted is loaded onto the transporter vehicle 2. In other words, the second specified time is set in such a manner that the freight W loaded on the first conveyance mechanism 11 at the time point at which the conveyance operation of the second conveyance mechanism 12 is restarted is not loaded onto the transporter vehicle 2, and all of the freight W loaded on the second conveyance mechanism 12 is loaded onto the transporter vehicle 2. In other words, the second specified time is a time required for loading all of the freight on the second conveyance mechanism 12 that reaches the target value at the time of restart of the second conveyance mechanism 12, onto the transporter vehicle 2.

The conveyance speed of the second conveyance mechanism 12 is set to the first conveyance speed, for example. In addition, the dimension of the conveyor 15 in the conveyance direction of the second conveyance mechanism 12 is known data. Accordingly, based on the lapse time from when the conveyance operation of the second conveyance mechanism 12 is restarted, the control apparatus 30 can determine whether the loading work of loading the freight W loaded on the second conveyance mechanism 12 onto the transporter vehicle 2 existing at the loading position P2 has been completed by the second conveyance mechanism 12. When it is determined that the lapse time from when the conveyance operation of the second conveyance mechanism 12 is restarted passes the second specified time, the control apparatus 30 determines that the loading work onto the transporter vehicle 2 has been completed by the second conveyance mechanism 12. In addition, based on the conveyance speed of the second conveyance mechanism 12, and a lapse time from when the conveyance operation of the second conveyance mechanism 12 is restarted, the second conveyance mechanism 12 may determine whether the loading work onto the transporter vehicle 2 has been completed by the second conveyance mechanism 12.

When it is determined in Step S292 that the second specified time has not elapsed (Step S292: No), the conveyance operation of the first conveyance mechanism 11 and the conveyance operation of the second conveyance mechanism 12 are continued.

When it is determined in Step S292 that the second specified time has elapsed (Step S292: Yes), the control apparatus 30 determines that all of the freight W loaded on the second conveyance mechanism 12 at the time point at which the conveyance operation of the second conveyance mechanism 12 is restarted has been loaded onto the transporter vehicle 2, and reports that the loading work has been completed, to the transporter vehicle 2. In addition, the function of the weight detection device 20 is turned on (Step S294).

After the completion of the loading work is reported to the transporter vehicle 2, the processing returns to the process in Step S210. The first conveyance control unit 41 operates the first conveyance mechanism 11 at the first conveyance speed continuously from Step S290, and the second conveyance control unit 42 operates the second conveyance mechanism 12 at the first conveyance speed continuously from Step S270. Thus, as illustrated in FIG. 12(B), at the time point at which the loading work onto the transporter vehicle 2 is completed, some quantity of the freight W to be loaded onto the next transporter vehicle 2 has already been conveyed from the first conveyance mechanism 11 to the second conveyance mechanism. This can shorten a required time from a time point at which the loading work onto the preceding transporter vehicle 2 is completed, to a time point at which the weight of the freight W to be loaded onto the next transporter vehicle 2 reaches the target value.

Hereinafter, the processes from Step S210 to Step S294 are repeated until a command signal for ending the conveyance work of the conveyance device 10 is input to the control apparatus 30.

The first specified time can be a time required for the second conveyance mechanism 12 conveying the freight W in the weight corresponding to a value obtained by subtracting the threshold from the target value (hereinafter, appropriately referred to as a difference weight conveyance time), for example. This can synchronize or bring close to each other a timing of completing the conveyance of the freight W from the second conveyance mechanism 12 to the transporter vehicle 2, and a timing of operating the first conveyance mechanism 11 and the second conveyance mechanism 12 at the second conveyance speed. The first specified time is not limited to the difference weight conveyance time. The second specified time is a time required for the freight W loaded on the second conveyance mechanism 12 being loaded onto the transporter vehicle 2.

As described above, according to the present embodiment, if the conveyance operation of the second conveyance mechanism 12 is restarted in Step S270, based on the lapse time from when the conveyance operation of the second conveyance mechanism 12 is restarted, it is determined whether all of the freight W loaded on the second conveyance mechanism 12 at the time point at which the conveyance operation of the second conveyance mechanism 12 is restarted has been conveyed to the loading position P2. Thus, it is determined whether the conveyance operation of the second conveyance mechanism 12 has been completed, without using the detection value of the weight detection device 20.

In addition, according to the present embodiment, if the conveyance operation of the second conveyance mechanism 12 is stopped in Step S250, based on the lapse time from when the conveyance operation of the second conveyance mechanism 12 is restarted, the conveyance operation of the first conveyance mechanism 11 is restarted. When it is determined that the first specified time has elapsed from when the conveyance operation of the second conveyance mechanism 12 is restarted, the conveyance operation of the first conveyance mechanism 11 is restarted in a state in which the conveyance operation of the second conveyance mechanism 12 is executed. The supply of the freight W from the first conveyance mechanism 11 to the second conveyance mechanism 12 is thereby restarted before all of the freight W loaded on the second conveyance mechanism 12 is supplied to the loading position P2, as illustrated in FIG. 12(A). Because the supply of the freight W from the first conveyance mechanism 11 to the second conveyance mechanism 12 is started without waiting for the completion of the conveyance operation including the loading work onto the transporter vehicle 2 that is performed by the second conveyance mechanism 12, the conveyance device 10 can efficiently convey the freight W.

In addition, in the present embodiment, a process of detecting the gap G of the freight W and a process of eliminating the gap G that have been described in the above-described second embodiment may be executed. For example, the processes from Step S112 to Step S118 that are illustrated in FIG. 8 may be executed in an interposed manner in a period in which the processes from Step S210 to Step S220 that are illustrated in FIG. 11 are executed.

In addition, in the present embodiment, based on a lapse time from when the conveyance operation of the second conveyance mechanism 12 is restarted, it is determined whether the loading work onto the transporter vehicle 2 has been completed by the second conveyance mechanism 12. Nevertheless, the determination may be performed by another method. For example, based on the detection value of the weight detection device 20 that has detected the weight of the freight W loaded on the second conveyance mechanism 12, it may be determined whether the loading work onto the transporter vehicle 2 has been completed by the second conveyance mechanism 12. Alternatively, based on both of the lapse time from when the conveyance operation of the second conveyance mechanism 12 is restarted, and the detection value of the weight detection device 20 that has detected the weight of the freight W loaded on the second conveyance mechanism 12, it may be determined whether the loading work onto the transporter vehicle 2 has been completed by the second conveyance mechanism 12. In addition, a weight sensor that can detect the weight of the freight W loaded on the first conveyance mechanism 11 may be provided, and based on a detection value of the weight sensor, it may be determined whether the loading work onto the transporter vehicle 2 has been completed by the second conveyance mechanism 12.

Fourth Embodiment

A fourth embodiment will be described. In the following description, components that are the same as or similar to those in the above-described embodiment are assigned the same reference numerals and the description thereof will be simplified or omitted.

Figure 13:
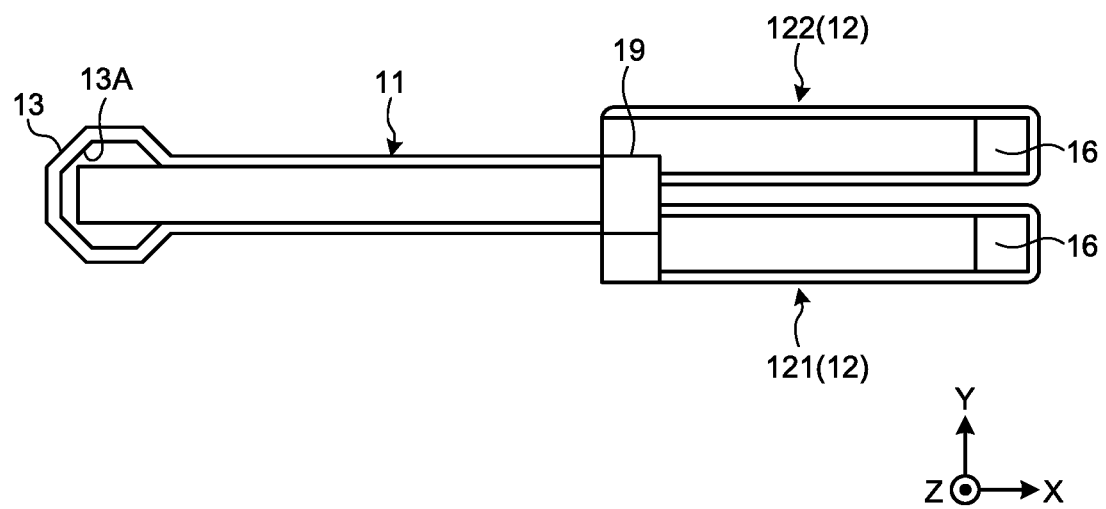
FIG. 13 is a plan view schematically illustrating an example of a conveyance system according to a fourth embodiment.

FIG. 13 is a plan view schematically illustrating an example of a conveyance system 100 according to the present embodiment. As illustrated in FIG. 13, the conveyance system 100 includes the conveyance device 10 including the first conveyance mechanism 11 that conveys the freight W supplied from the loader 1, and a plurality of second conveyance mechanisms 12 that conveys the freight W supplied from the first conveyance mechanism 11. One first conveyance mechanism 11 is provided. A plurality of second conveyance mechanisms 12 is provided. In the present embodiment, two second conveyance mechanisms 12 are provided. In the following description, one of the second conveyance mechanisms 12 will be appropriately referred to as a second conveyance mechanism 121 and the other one of the second conveyance mechanisms 12 will be appropriately referred to as a second conveyance mechanism 122.

The conveyance system 100 includes a switch mechanism 19 that switches the second conveyance mechanism to which the freight W from the first conveyance mechanism 11 is to be supplied. The switch mechanism 19 switches a state from one of a first conveyance state in which the freight W is supplied from the first conveyance mechanism 11 to the second conveyance mechanism 121, and a second conveyance state in which the freight W is supplied from the first conveyance mechanism 11 to the second conveyance mechanism 122, to the other one.

The first conveyance state indicates that a discharge destination of the freight W that is set by the switch mechanism 19 is the second conveyance mechanism 121. The second conveyance state indicates that a discharge destination of the freight W that is set by the switch mechanism 19 is the second conveyance mechanism 122. Whichever of the second conveyance mechanism 121 and the second conveyance mechanism 122 is set by the switch mechanism 19 as a discharge destination of the freight W, the conveyance operation of the first conveyance mechanism 11 does not change.

The control apparatus 30 sequentially starts conveyance operations of the plurality of second conveyance mechanisms 12 (121, 122), and controls the switch mechanism 19 in such a manner that the freight W is supplied from the first conveyance mechanism 11 to the second conveyance mechanism 12 determined to have completed the loading work onto the transporter vehicle 2 and have no freight W loaded thereon.

The weight detection device 20 is provided in each of the plurality of second conveyance mechanisms 12 (121, 122) The weight detection device 20 detects the weight of the freight W loaded on each of the plurality of second conveyance mechanisms 12. The weight detection devices 20 transmit a detection signal indicating a detection value of the weight of the freight. W loaded on the second conveyance mechanism 121, and a detection signal indicating a detection value of the weight of the freight W loaded on the second conveyance mechanism 122, to the control apparatus 30. The control apparatus 30 controls the switch mechanism 19 based on the detection values of the weight detection devices 20.

Figure 14:
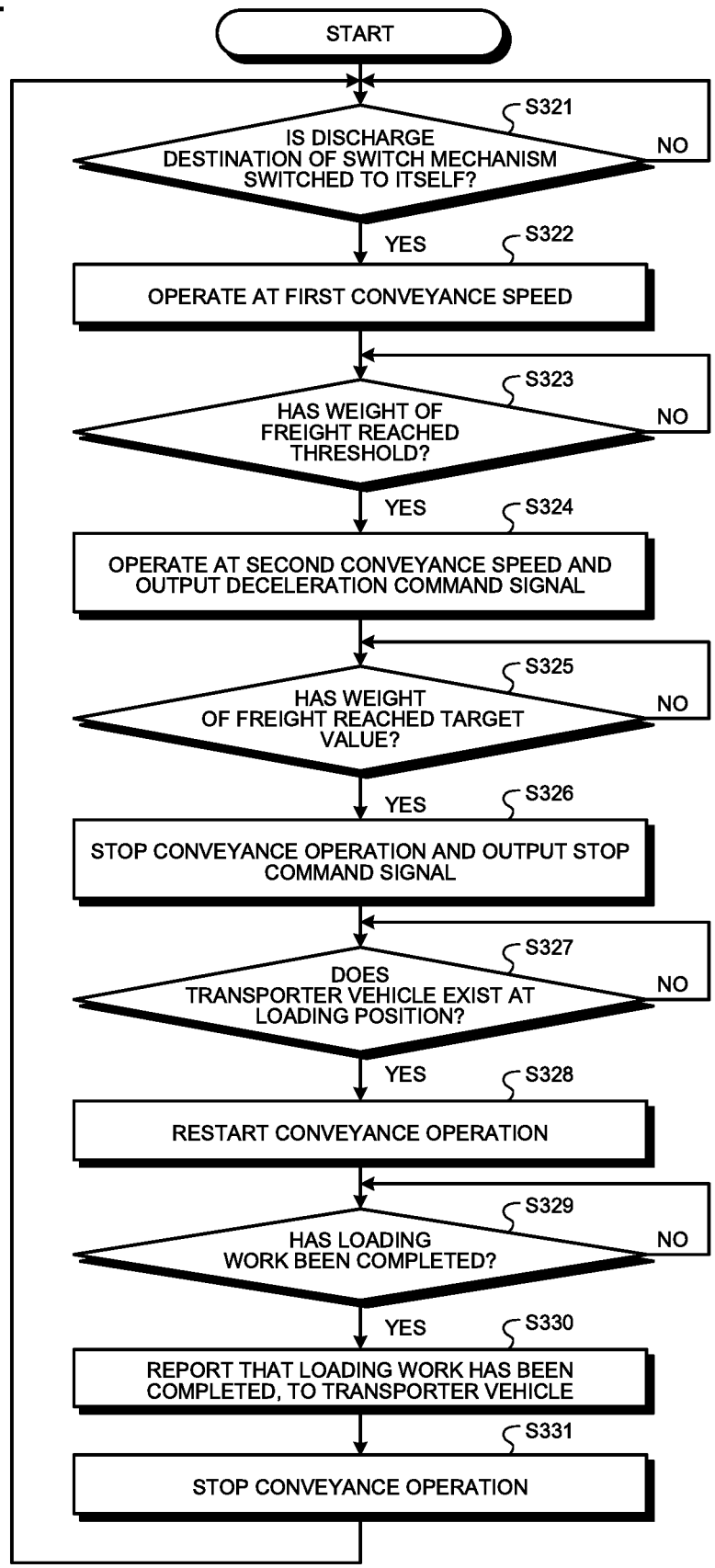
FIG. 14 is a flowchart illustrating an example of a conveyance method according to the fourth embodiment.
Figure 15:
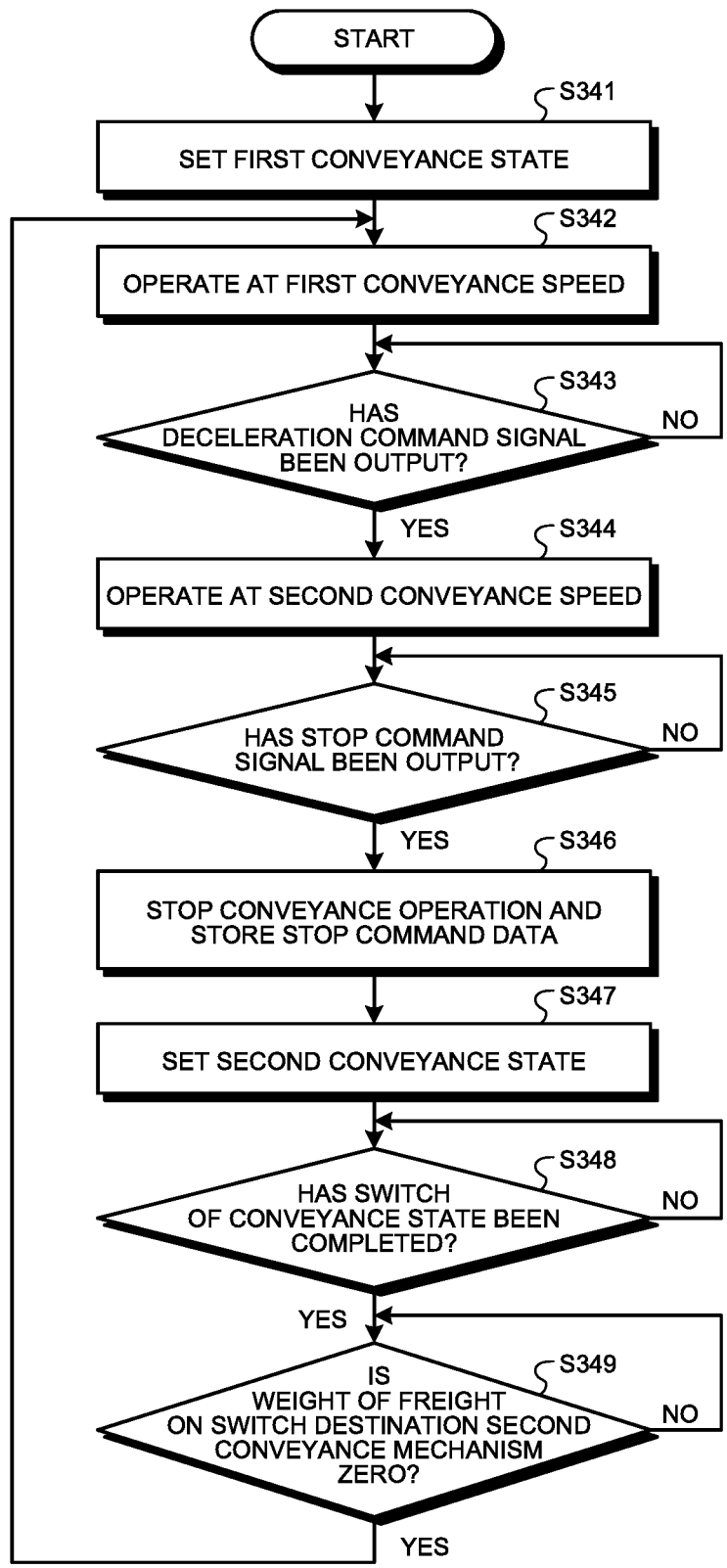
FIG. 15 is a flowchart illustrating an example of a conveyance method according to the fourth embodiment.

Next, an example of a conveyance method according to the present embodiment will be described. FIGS. 14 and 15 are flowcharts each illustrating an example of a conveyance method according to the present embodiment. FIG. 14 is a flowchart illustrating a conveyance operation of the second conveyance mechanism 121. FIG. 15 is a flowchart illustrating a conveyance operation of the first conveyance mechanism 11.

In addition, the flowchart illustrating a conveyance operation of the second conveyance mechanism 122 is the same as the flowchart illustrated in FIG. 14 except for Step S321. A difference from the conveyance operation of the second conveyance mechanism 121 in Step S321 will be described later.

The conveyance operation of the second conveyance mechanism 121 according to the present embodiment will be described with reference to FIG. 14. The first conveyance control unit 41 controls the switch mechanism 19 so as to set the first conveyance state in which the freight W is supplied from the first conveyance mechanism 11 to the second conveyance mechanism 121. The second conveyance control unit 42 determines whether the first conveyance state is set, based on a control signal output from the first conveyance control unit 41 to the switch mechanism 19. In other words, based on a control signal output from the first conveyance control unit 41 to the switch mechanism 19, the second conveyance control unit 42 determines whether a discharge destination of freight that is set by the switch mechanism 19 is switched to the second conveyance mechanism 121 (Step S321).

In addition, in the flowchart illustrating the conveyance operation of the second conveyance mechanism 122, the first conveyance control unit 41 controls the switch mechanism 19 so as to set the second conveyance state in which the freight W is supplied from the first conveyance mechanism 11 to the second conveyance mechanism 122. In addition, in place of Step S321 described above, the second conveyance control unit 42 determines whether the second conveyance state is set, based on the control signal output from the first conveyance control unit 41 to the switch mechanism 19.

The description returns to the flowchart of the second conveyance mechanism 121. When it is determined in Step S321 that a discharge destination of freight that is set by the switch mechanism 19 is not switched to the second conveyance mechanism 121 and the state is not the first conveyance state (Step S321: No), the processing returns to the process in Step S321.

When it is determined in Step S321 that a discharge destination of freight that is set by the switch mechanism 19 is switched to the second conveyance mechanism 121 and the state is the first conveyance state (Step S321: Yes), the second conveyance control unit 42 operates the second conveyance mechanism 121 at the first conveyance speed (Step S322).

Based on a detection value of the weight detection device 20, the weight determination unit 43 determines whether the weight of the freight W loaded on the second conveyance mechanism 121 has reached a threshold (Step S323).

When it is determined in Step S323 that the weight of the freight W loaded on the second conveyance mechanism 121 is equal to or less than the threshold (Step S323: No), the second conveyance mechanism 121 continues the conveyance operation at the first conveyance speed.

When it is determined in Step S323 that the weight of the freight W loaded on the second conveyance mechanism 121 has reached the threshold (Step S323: Yes), the conveyance speed of the second conveyance mechanism 121 is decelerated. The second conveyance control unit 42 operates the second conveyance mechanism 121 at the second conveyance speed lower than the first conveyance speed. In addition, the second conveyance control unit 42 outputs, to the first conveyance control unit 41, a deceleration command signal for operating the first conveyance mechanism 11 at the second conveyance speed lower than the first conveyance speed (Step S324).

Based on a detection value of the weight detection device 20, the weight determination unit 43 determines whether the weight of the freight W loaded on the second conveyance mechanism 121 has reached the target value (Step S325).

When it is determined in Step S325 that the weight of the freight W loaded on the second conveyance mechanism 121 is equal to or less than the target value (Step S325: No), the second conveyance control unit 42 continues the conveyance operation in a state in which the conveyance speed of the second conveyance mechanism 121 is decelerated.

When it is determined in Step S325 that the weight of the freight W loaded on the second conveyance mechanism 121 has reached the target value (Step S325: Yes), the second conveyance control unit 42 stops the conveyance operation of the second conveyance mechanism 121. In addition, the second conveyance control unit 42 outputs, to the first conveyance control unit 41, a stop command signal for stopping the conveyance operation of the first conveyance mechanism 11 (Step S326).

The standby determination unit 44 determines whether the transporter vehicle 2 exists at the loading position P2 (Step S327).

When it is determined in Step S327 that the transporter vehicle 2 does not exist at the loading position P2 (Step S327: No), a state in which the conveyance operation of the second conveyance mechanism 121 is stopped is continued.

When it is determined in Step S327 that the transporter vehicle 2 exists at the loading position P2 (Step S327: Yes), the second conveyance control unit 42 restarts the conveyance operation of the second conveyance mechanism 121 that conveys the freight W loaded on the second conveyance mechanism 121, to the loading position P2, in a state in which the conveyance operation of the first conveyance mechanism 11 is stopped (Step S328).

Based on the detection value of the weight detection device 20, the weight determination unit 43 determines whether the loading work onto the transporter vehicle 2 has been completed by the second conveyance mechanism 121 (Step S329).

When it is determined in Step S329 that the loading work onto the transporter vehicle 2 has not been completed by the second conveyance mechanism 121 (Step S329: No), the processing returns to the process in Step S329.

When it is determined in Step S329 that the loading work onto the transporter vehicle 2 has been completed by the second conveyance mechanism 121 (Step S329: Yes), the control apparatus 30 reports that the loading work has been completed, to the transporter vehicle 2 (Step S330).

In addition, the second conveyance control unit 42 stops the conveyance operation of the second conveyance mechanism 121 (Step S331).

Next, the conveyance operation of the first conveyance mechanism 11 according to the present embodiment will be described with reference to FIG. 15.

The first conveyance control unit 41 controls the switch mechanism 19 so as to set the first conveyance state in which the freight W is supplied from the first conveyance mechanism 11 to the second conveyance mechanism 121 (Step S341).

The first conveyance control unit 41 operates the first conveyance mechanism 11 at the first conveyance speed (Step S342).

The first conveyance control unit 41 determines whether a deceleration command signal has been output from the second conveyance control unit 42 (Step S343).

As described with reference to FIG. 14, when it is determined that the weight of the freight W loaded on the second conveyance mechanism 121 has reached the threshold, the second conveyance control unit 42 outputs, to the first conveyance control unit 41, a deceleration command signal for operating the first conveyance mechanism 11 at the second conveyance speed lower than the first conveyance speed (Step S324). The first conveyance control unit 41 determines whether a deceleration command signal has been output from the second conveyance control unit 42.

When it is determined in Step S343 that a deceleration command signal has not been output (Step S343: No), the first conveyance mechanism 11 continues the conveyance operation at the first conveyance speed.

When it is determined in Step S343 that a deceleration command signal has been output (Step S343: Yes), the conveyance speed of the first conveyance mechanism 11 is decelerated. The first conveyance control unit 41 operates the first conveyance mechanism 11 at the second conveyance speed lower than the first conveyance speed (Step S344).

The first conveyance control unit 41 determines whether a stop command signal has been output from the second conveyance control unit 42 (Step S345).

As described with reference to FIG. 14, when it is determined that the weight of the freight W loaded on the second conveyance mechanism 121 has reached the target value, the second conveyance control unit 42 outputs, to the first conveyance control unit 41, a stop command signal for stopping the conveyance operation of the first conveyance mechanism 11 (Step S326). The first conveyance control unit 41 determines whether a stop command signal has been output from the second conveyance control unit 42.

When it is determined in Step S345 that a stop command signal has not been output (Step S345: No), the first conveyance control unit 41 continues the conveyance operation while decelerating the conveyance speed of the first conveyance mechanism 11.

When it is determined in Step S345 that a stop command signal has been output (Step S345: Yes), the first conveyance control unit 41 stops the conveyance operation of the first conveyance mechanism 11. In addition, the first conveyance control unit 41 stores stop command data indicating which of the two second conveyance mechanisms 12 (the second conveyance mechanism 121 and the second conveyance mechanism 122 of the second conveyance mechanisms 12) has output the stop command signal (here, the second conveyance mechanism 121), into the storage device 32 (Step S346).

Based on the stop command data stored in the storage device 32, the first conveyance control unit 41 controls the switch mechanism 19 so as to set the other conveyance state (here, the second conveyance state) in which the freight W is supplied from the first conveyance mechanism to the second conveyance mechanism 122 (Step S347).

The first conveyance control unit 41 determines whether switch from one conveyance state (here, the first conveyance state) to the other conveyance state (here, the second conveyance state) has been completed (Step S348).

When it is determined in Step S348 that switch of the conveyance state has not been completed (Step S348: No), the first conveyance control unit 41 returns to the process in Step S348.

When it is determined in Step S348 that switch of the conveyance state has been completed (Step S348: Yes), the first conveyance control unit 41 determines whether the weight of the freight W loaded on the second conveyance mechanism 122, which is a switch destination, is zero (Step S349).

When it is determined in Step S349 that the weight of the freight W loaded on the second conveyance mechanism 122, which is a switch destination, is not zero (Step S349: No), the first conveyance control unit 41 returns to the process in Step S349.

When it is determined in Step S349 that the weight of the freight W loaded on the second conveyance mechanism 122, which is a switch destination, is zero (Step S349: Yes), the first conveyance control unit 41 returns to the process in Step S342, and executes a series of processes from Step S342 to Step S349.

As described above, according to the present embodiment, a plurality of second conveyance mechanisms 12 is provided, and the switch mechanism 19 that switches the second conveyance mechanism 12 to which the freight W from the first conveyance mechanism 11 is supplied is provided. The control apparatus 30 sequentially starts conveyance operations of the plurality of second conveyance mechanisms 12, and controls the switch mechanism 19 in such a manner that the freight W is supplied from the first conveyance mechanism 11 to the second conveyance mechanism 12 determined to have completed the conveyance operation. The freight W can thereby be supplied from the first conveyance mechanism 11 to the second conveyance mechanism 122, in a state in which the freight W is supplied from the second conveyance mechanism 121 to the transporter vehicle 2, for example. In addition, if the next transporter vehicle 2 is promptly disposed at the loading position P2 after the transporter vehicle 2 that has ended the loading work moves from the loading position P2, the freight W loaded on the second conveyance mechanism 122 can be promptly supplied to the transporter vehicle 2. This can suppress deterioration in productivity that is attributed to a wait time of the transporter vehicle 2.

In addition, also in the present embodiment, the gap detection device 21 described in the above-described second embodiment can be used.

In addition, in the present embodiment, a report system that reports the second conveyance mechanism 12 that can start a loading work next out of the two second conveyance mechanisms 12, to the next transporter vehicle 2, when a loading work onto the transporter vehicle 2 from one of the second conveyance mechanisms 12 ends may be provided. As a report system, for example, at least one of a light emitting device such as a lamp, a warning tone generation device, and a communication device that communicates report data to the next transporter vehicle 2 is exemplified.

In addition, in each of the above-described embodiments, the control apparatus 30 needs not always be provided in the conveyance device 10, and may be provided in a location other than the conveyance device 10 such as a remote location, for example, and may control the conveyance device 10 by wired or wireless communication.

In addition, in each of the above-described embodiments, a container-shaped reservoir portion of freight such as a bin may be used as the second conveyance mechanism 12. By a lid member that can open and close an opening provided at the bottom portion of a container being provided, when the transporter vehicle 2 does not exist at the loading position P2, the opening of the container is closed, and when the transporter vehicle 2 exists at the loading position 92, the opening of the container is opened. The freight W can thereby be supplied to the transporter vehicle 2. In addition, in each of the above-described embodiments, a bucket having a mechanism similar to a vessel of a dump truck, for example, may be used as the second conveyance mechanism 12.

REFERENCE SIGNS LIST

1 LOADER
2 TRANSPORTER VEHICLE
3 TRAVEL BODY
4 SWING BODY
5 WORKING EQUIPMENT
5A BOOM
5B ARM
5C BUCKET
6 TIRE
7 TRAVEL APPARATUS
8 VEHICLE BODY
9 VESSEL
10 CONVEYANCE DEVICE
11 FIRST CONVEYANCE MECHANISM
11A RECEIVING UNIT
11B FEEDING UNIT
11C CONVEYANCE UNIT
12 SECOND CONVEYANCE MECHANISM
12A RECEIVING UNIT
12B FEEDING UNIT
12C CONVEYANCE UNIT
13 HOPPER
13A INPUT PORT
13B RESERVOIR PORTION
14 CONVEYOR
14A SPROCKET
14B APRON
14C ACTUATOR
15 CONVEYOR

15A SPROCKET
15B APRON
15C ACTUATOR
16 SHOOTER
16A INPUT PORT
16B DISCHARGE PORT
17 SIDE WALL
18 SIDE WALL
19 SWITCH MECHANISM
20 WEIGHT DETECTION DEVICE
21 GAP DETECTION DEVICE
22 TIMER
30 CONTROL APPARATUS
31 ARITHMETIC PROCESSING UNIT
32 STORAGE DEVICE
33 INPUT-OUTPUT INTERFACE
41 FIRST CONVEYANCE CONTROL UNIT
42 SECOND CONVEYANCE CONTROL UNIT
43 WEIGHT DETERMINATION UNIT
44 STANDBY DETERMINATION UNIT
45 GAP DETERMINATION UNIT
46 LAPSE TIME DETERMINATION UNIT
70 TRAVEL APPARATUS
71 CRAWLER TRACK
72 DRIVE SOURCE
100 CONVEYANCE SYSTEM
W FREIGHT

The invention claimed is:

1. A conveyance system comprising:
a conveyance device including a first conveyance mechanism configured to convey freight supplied from a loader, and a second conveyance mechanism configured to convey the freight supplied from the first conveyance mechanism;
a weight detection device configured to detect weight of the freight loaded on the second conveyance mechanism; and
a control apparatus,
wherein the control apparatus includes a first conveyance control unit configured to control the first conveyance mechanism,
wherein the first conveyance control unit controls the first conveyance mechanism based on a detection value of the weight detection device, and
wherein, when it is determined that the detection value has reached a target value, the first conveyance control unit stops a conveyance operation of the first conveyance mechanism.

2. The conveyance system according to claim 1,
wherein the control apparatus further includes a second conveyance control unit configured to control the second conveyance mechanism, and
wherein, when it is determined that the detection value has reached the target value, the second conveyance control unit stops a conveyance operation of the second conveyance mechanism.

3. The conveyance system according to claim 2, wherein the second conveyance control unit controls the second conveyance mechanism based on a result obtained by determining whether a transporter vehicle exists at a loading position.

4. The conveyance system according to claim 3, wherein, when it is determined that the transporter vehicle exists at the loading position, the second conveyance control unit restarts the conveyance operation of the second conveyance mechanism to start a loading work onto the transporter vehicle.

5. The conveyance system according to claim 4, wherein, when it is determined that a loading work onto the transporter vehicle has been completed, the first conveyance control unit restarts the conveyance operation of the first conveyance mechanism.

6. The conveyance system according to claim 5, wherein the first conveyance control unit determines whether a loading work onto the transporter vehicle has been completed, based on a detection value of the weight detection device.

7. The conveyance system according to claim 5, wherein the first conveyance control unit determines whether a loading work onto the transporter vehicle has been completed, based on a lapse time from when the conveyance operation of the second conveyance mechanism is restarted.

8. The conveyance system according to claim 4, wherein, when it is determined that a first specified time has elapsed from when the conveyance operation of the second conveyance mechanism is restarted, the first conveyance control unit restarts the conveyance operation of the first conveyance mechanism.

9. The conveyance system according to claim 8, wherein the first specified time is shorter than a time from when a loading work onto the transporter vehicle is started to when the loading work is completed.

10. The conveyance system according to claim 3, wherein, when it is determined that a detection value of the weight detection device is equal to or less than a threshold which is smaller than the target value, the first conveyance control unit operates the first conveyance mechanism at a first conveyance speed, and when it is determined that the detection value of the weight detection device has reached the threshold, the first conveyance control unit operates the first conveyance mechanism at a second conveyance speed lower than the first conveyance speed.

11. The conveyance system according to claim 3, wherein the target value is defined based on a maximum loading amount of the transporter vehicle.

12. A conveyance system comprising:
a conveyance device including a first conveyance mechanism configured to convey freight supplied from a loader, and a second conveyance mechanism configured to convey the freight supplied from the first conveyance mechanism;
a weight detection device configured to detect weight of the freight loaded on the second conveyance mechanism; and
a control apparatus,
wherein the control apparatus includes a first conveyance control unit configured to control the first conveyance mechanism,
wherein the first conveyance control unit controls the first conveyance mechanism based on a detection value of the weight detection device,
wherein the first conveyance mechanism includes a hopper to which the freight is to be supplied from the loader, and a conveyance unit configured to continuously convey the freight supplied to the hopper,
wherein a gap detection device configured to detect a gap of the freight conveyed by the conveyance unit of the first conveyance mechanism is included, and
wherein the control apparatus controls the second conveyance mechanism based on a detection result of the gap detection device.

13. The conveyance system according to claim 12, wherein, when the gap is detected, the control apparatus stops the conveyance operation of the second conveyance mechanism in a state in which the conveyance operation of the first conveyance mechanism is continued.

14. A conveyance system comprising:
  a first conveyance mechanism configured to convey freight supplied from a loader;
  a plurality of second conveyance mechanisms configured to convey the freight supplied from the first conveyance mechanism;
  a switch mechanism configured to switch the second conveyance mechanism to which the freight from the first conveyance mechanism is to be supplied;
  a weight detection device configured to detect weight of the freight loaded on each of the plurality of second conveyance mechanisms; and
  a control apparatus configured to control the switch mechanism based on a detection value of the weight detection device.

15. A conveyance system comprising:
  a conveyance device including a first conveyance mechanism configured to convey freight supplied from a loader, and a second conveyance mechanism configured to convey the freight supplied from the first conveyance mechanism;
  a weight detection device configured to detect weight of the freight loaded on the second conveyance mechanism;
  a control apparatus, and
  a travel apparatus configured to movably support the conveyance device,
  wherein the control apparatus includes a first conveyance control unit configured to control the first conveyance mechanism, and
  wherein the first conveyance control unit controls the first conveyance mechanism based on a detection value of the weight detection device.

16. A control apparatus comprising:
  a first conveyance control unit configured to control a conveyance operation of a first conveyance mechanism configured to convey freight supplied from a loader;
  a second conveyance control unit configured to control a conveyance operation of a second conveyance mechanism configured to convey the freight supplied from the first conveyance mechanism;
  a weight determination unit configured to determine whether weight of freight loaded on the second conveyance mechanism has reached a target value; and
  an input-output interface,
  wherein the weight determination unit receives, via the input-output interface, a detection value indicating weight of the freight loaded on the second conveyance mechanism,
  wherein the first conveyance control unit generates a control signal for controlling a conveyance operation of the first conveyance mechanism, based on a determination result of the weight determination unit, and
  wherein the input-output interface outputs the control signal generated by the first conveyance control unit.

17. A conveyance method of using a system for conveying, by a second conveyance mechanism, freight supplied from a loader via a first conveyance mechanism, the conveyance method comprising:
  detecting weight of the freight loaded on the second conveyance mechanism; and
  controlling a conveyance operation of the first conveyance mechanism based on the detected weight of the freight on the second conveyance mechanism,
  wherein, when it is determined that a detection value of the detected weight has reached a target value, the conveyance operation of the first conveyance mechanism is stopped.

\* \* \* \* \*